United States Patent
Tsushima et al.

(10) Patent No.: US 10,061,994 B2
(45) Date of Patent: Aug. 28, 2018

(54) DRIVING-SUPPORT-IMAGE GENERATION DEVICE, DRIVING-SUPPORT-IMAGE DISPLAY DEVICE, DRIVING-SUPPORT-IMAGE DISPLAY SYSTEM, AND DRIVING-SUPPORT-IMAGE GENERATION PROGRAM

(71) Applicant: Mitsubishi Electric Corporation, Tokyo (JP)

(72) Inventors: Naoyuki Tsushima, Tokyo (JP); Shu Murayama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 155 days.

(21) Appl. No.: 15/032,185

(22) PCT Filed: Nov. 12, 2013

(86) PCT No.: PCT/JP2013/006636
§ 371 (c)(1),
(2) Date: Apr. 26, 2016

(87) PCT Pub. No.: WO2015/071923
PCT Pub. Date: May 21, 2015

(65) Prior Publication Data
US 2016/0267332 A1 Sep. 15, 2016

(51) Int. Cl.
*G06K 9/00* (2006.01)
*G06K 9/32* (2006.01)
(Continued)

(52) U.S. Cl.
CPC ..... *G06K 9/00818* (2013.01); *G01C 21/3655* (2013.01); *G06K 9/00442* (2013.01);
(Continued)

(58) Field of Classification Search
CPC ........... G01C 21/3602; G06K 9/00791; G06K 9/00818; G06K 9/00442; G06K 9/3258; G06K 9/46; G06T 11/60
(Continued)

(56) References Cited

U.S. PATENT DOCUMENTS

| 6,560,529 B1 * | 5/2003 | Janssen | G01C 21/28 |
| | | | 340/988 |
| 2009/0128311 A1 * | 5/2009 | Nishimura | G08G 1/166 |
| | | | 340/435 |

(Continued)

FOREIGN PATENT DOCUMENTS

| CN | 101356078 A | 1/2009 |
| CN | 102027329 A | 4/2011 |

(Continued)

*Primary Examiner* — Van D Huynh
(74) *Attorney, Agent, or Firm* — Birch, Stewart, Kolasch & Birch, LLP

(57) ABSTRACT

A driving-support-image generation device of the present invention comprises: a character recognizer that recognizes a character in an image indicative of a message content of a messaging object posted on a road or around a road; and an image processor that generates, based on the character recognized by the character recognizer and driving-support information related to the character, a driving-support image obtained by modifying the image of the messaging object into an image matched to the driving-support information.

5 Claims, 18 Drawing Sheets

(51) Int. Cl.
 *G01C 21/36* (2006.01)
 *G06K 9/46* (2006.01)
 *G06T 11/60* (2006.01)
 *G08G 1/0962* (2006.01)

(52) U.S. Cl.
 CPC ............ *G06K 9/3258* (2013.01); *G06K 9/46* (2013.01); *G06T 11/60* (2013.01); *G08G 1/09623* (2013.01); *G06K 2209/01* (2013.01); *G06T 2207/30168* (2013.01)

(58) Field of Classification Search
 USPC ......................................................... 382/104
 See application file for complete search history.

(56) References Cited

U.S. PATENT DOCUMENTS

| | | | | |
|---|---|---|---|---|
| 2009/0276153 | A1* | 11/2009 | Lee | G01C 21/28 701/414 |
| 2010/0103040 | A1* | 4/2010 | Broadbent | G01S 19/48 342/357.28 |
| 2010/0302361 | A1* | 12/2010 | Yoneyama | G06K 9/00818 348/135 |
| 2011/0112756 | A1 | 5/2011 | Winkler et al. | |
| 2012/0046855 | A1* | 2/2012 | Wey | G08G 1/09623 701/117 |
| 2014/0327772 | A1* | 11/2014 | Sahba | G06K 9/00818 348/148 |

FOREIGN PATENT DOCUMENTS

| | | |
|---|---|---|
| CN | 102376166 A | 3/2012 |
| JP | 4-5239 B2 | 1/1992 |
| JP | 5-52999 U | 7/1993 |
| JP | 7-73269 A | 7/1993 |
| JP | 7-167668 A | 7/1995 |
| JP | 2007-114971 A | 5/2007 |
| JP | 2007-225282 A | 9/2007 |
| JP | 2008-157760 A | 7/2008 |
| JP | 2009-109404 A | 5/2009 |
| JP | 2009-210431 A | 9/2009 |
| JP | 2009-210432 A | 9/2009 |
| JP | 2010-266383 A | 11/2010 |
| JP | 2010-282278 A | 12/2010 |
| WO | WO 2013/088510 A1 | 6/2013 |

* cited by examiner (A)

(B)

DRIVING-SUPPORT-IMAGE GENERATION DEVICE, DRIVING-SUPPORT-IMAGE DISPLAY DEVICE, DRIVING-SUPPORT-IMAGE DISPLAY SYSTEM, AND DRIVING-SUPPORT-IMAGE GENERATION PROGRAM

TECHNICAL FIELD

This invention relates to a driving-support-image generation device, a driving-support-image display device, a driving-support-image display system and a driving-support-image generation program, for displaying a messaging object on a road or around a road, on a display in a vehicle to thereby support its driving.

BACKGROUND ART

At roads, there are posted traffic signs indicative of information about a speed limit, a parking prohibition and the like. Although a passenger in a vehicle visually recognizes these traffic signs, because of having to turn his/her sight line to each traffic sign, the passenger often overlooks the traffic sign. In order to allow the passenger, when overlooked such a traffic sign, to confirm the overlooked traffic sign, there has been invented such a technology in which a road front-scenery image is acquired by a camera mounted on the vehicle, and a traffic sign is recognized from the acquired image and is then displayed on a display (for example, Patent Document 1).

CITATION LIST

Patent Document

Patent Document 1: Japanese Examined Patent Publication No. H04-5239

SUMMARY OF THE INVENTION

Problems to be Solved by the Invention

However, in the technology described in Patent Document 1, what is done is only to display an image of the traffic sign captured by the camera, on the display. Accordingly, this may result in displaying even unwanted information for the passenger, so that a problem arises in that an image display matched to the situation of a vehicle is not achieved, thus disturbing comfortable driving.

In order to solve the problem as described above, an object of this invention is to provide an image matched to the situation of a vehicle at the time a messaging object such as a traffic sign or the like is to be displayed.

Means for Solving the Problems

A driving-support-image generation device of the invention is characterized by comprising: a character recognizer that recognizes a character in an image indicative of a message content of a messaging object posted on a road or around a road; a vehicle-information determination processor that determines whether or not the character recognized by the character recognizer corresponds to information related to a vehicle of a host vehicle; and an image processor that generates a driving-support image in which the character that has been determined to correspond to the information related to the vehicle of the host vehicle by the vehicle-information determination processor is highlighted.

A driving-support-image display device of the invention is characterized by comprising a display that displays, when a character in an image indicative of a message content of a messaging object posted on a road or around a road is the character corresponding to information related to a vehicle of a host vehicle, a driving-support image in which the character in the image indicative of the message content of the messaging object is highlighted.

A driving-support-image display system of the invention is characterized by comprising: an image capturing device that captures a messaging object posted on a road or around a road; a driving-support-image generation device which comprises a character recognizer that recognizes a character in an image indicative of a message content of the messaging object captured by the image capturing device, a vehicle-information determination processor that determines whether or not the character recognized by the character recognizer corresponds to information related to a vehicle of a host vehicle, and an image processor that generates a driving-support image in which the character that has been determined to correspond to the information related to the vehicle of the host vehicle by the vehicle-information determination processor is highlighted; and a display that displays the driving-support image generated by the driving-support-image generation device.

A driving-support-image generation program of the invention is characterized in that it causes a computer to implement: character recognition processing of recognizing a character in an image indicative of a message content of a messaging object posted on a road or around a road; a vehicle-information determination processing of determining whether or not the character recognized by the character recognizer corresponds to information related to a vehicle of a host vehicle; and an image processing of generating a driving-support image in which the character that has been determined to correspond to the information related to the vehicle of the host vehicle by the vehicle-information determination processor is highlighted.

Effect of the Invention

In accordance with the driving-support-image generation device, the driving-support-image display device, the driving-support-image display system and the driving-support-image generation program, according to the invention, the content of the messaging object in the image to be displayed is modified based on the driving-support information related to the character in the messaging object. Thus, it is possible to provide a driving-support image matched to the situation of a vehicle, to thereby assist the passenger to make recognition about the content of the messaging object.

MODES FOR CARRYING OUT THE INVENTION

Embodiment 1

Figure 1:
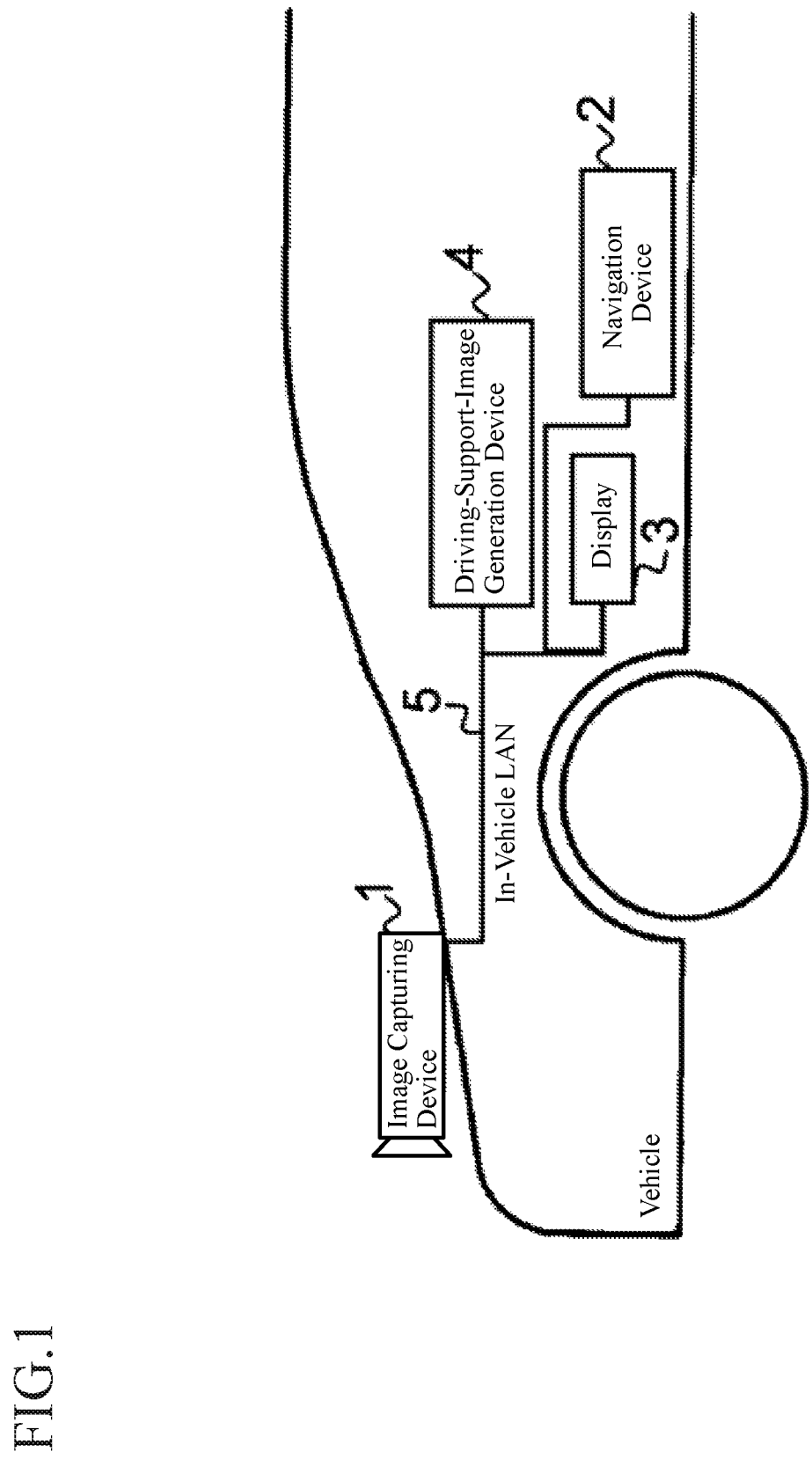
FIG. 1 is a configuration diagram of a driving-support-image display system according to Embodiment 1.

In the following, a driving-support-image display system according to Embodiment 1 of the invention will be described using FIG. 1.

The driving-support-image display system according to Embodiment 1 includes an image capturing device 1, a navigation device 2, a display 3 and a driving-support-image generation device 4. The image capturing device 1, the navigation device 2, the display 3 and the driving-support-image generation device 4 are connected by wire or wirelessly to each other by means of an in-vehicle LAN 5. Note that the display 3 and the driving-support-image generation device 4 constitute a driving-support-image display device.

The image capturing device 1 is a camera mounted on an front exterior portion of a vehicle, and captures to acquire, as an image, a scenery image including a messaging object on a road or around a road. Here, the messaging object means an object by which at least a character is represented, such as, a traffic sign/shop sign placed on a vehicle-traveling road or around the road, a character itself painted on the road, or the like. The image capturing device 1 captures for every predetermined time interval, the messaging object posted at the road, and outputs information related to the image thus-captured to the driving-support-image generation device 4. Note that the image capturing device 1 is not limited to that which captures a scenery image including the messaging object for every predetermined time interval, and may be configured to capture the messaging object when it emerges in the imaging area of the image capturing device 1. Further, although the mounted position of the image capturing device 1 is given at the front exterior portion of the vehicle as shown in FIG. 1, it may be a position that allows capturing of the messaging object placed on the road or around the road, and thus it is allowable that the image capturing device is placed so as to capture the outside of the vehicle from the inside of the vehicle. In the following description, a scenery image acquired by the image capturing device 1 and including the messaging object is referred to as a captured image.

The navigation device 2 includes a location identification means (not shown) that identifies a location of the vehicle using GPS (Global Positioning System), etc., and a guide means (not shown) that guides the vehicle to a setup destination point or route point, so that the vehicle is guided, when a destination point and a route point are set by the passenger, to the destination point and the route point. The driving-support-image generation device 4 that will be described later can acquire information related to the destination point, the route point and the location of the vehicle, from the navigation device 2.

The display 3 is an instrument panel in which placed are instruments for indicating information necessary for vehicle traveling, such as, a speed meter, a tachometer, a fuel meter and the like, of the vehicle, and the display, upon receiving image information from the driving-support-image generation device 4 that will be described later, displays the corresponding image. As instrument panels, mechanical meters have heretofore been in the mainstream; however, in recent years, replacement of mechanical displays with non-mechanical ones is going forward because of reduction in price and increase in screen size of liquid crystal display devices and the like. This causes the instrument panel to have an enhanced flexibility about the contents to be displayed, thus allowing the driving-support image that will be described later to be displayed, so that its convenience is particularly enhanced. Note that the display 3 is not limited to the instrument panel, and may be any one that can display an image. For example, the display 3 may be a monitor that displays a guide display of the navigation device 2, or may be a head-up display placed behind the front glass of the vehicle.

The driving-support-image generation device 4 cuts out the messaging object from the captured image acquired by the image capturing device 1, modifies the cutout image of the messaging object into an image matched to driving-support information, and displays it on the display 3. Note that the driving-support information is information for supporting traveling of the vehicle, and is information related to the character that is represented on the messaging object and is subject to modification. For example, the driving-support information is information related to: a destination point or a route point set in the navigation device 2; a location of the vehicle; a clock time; and vehicle information such as a vehicle type, etc. of the host vehicle. In this embodiment, the destination point or route point set in the navigation device 2, which is provided as information related to the character represented on the messaging object and indicative of a building, a place name, an area or the like, is used as the driving-support information.

The in-vehicle LAN 5 connects, by wire or wirelessly, the image capturing device 1, the navigation device 2, the display 3 and the driving-support-image generation device 4 to each other. The image capturing device 1, the navigation device 2, the display 3 and the driving-support-image generation device 4 perform information exchange therebetween by way of the in-vehicle LAN 5.

Figure 2:
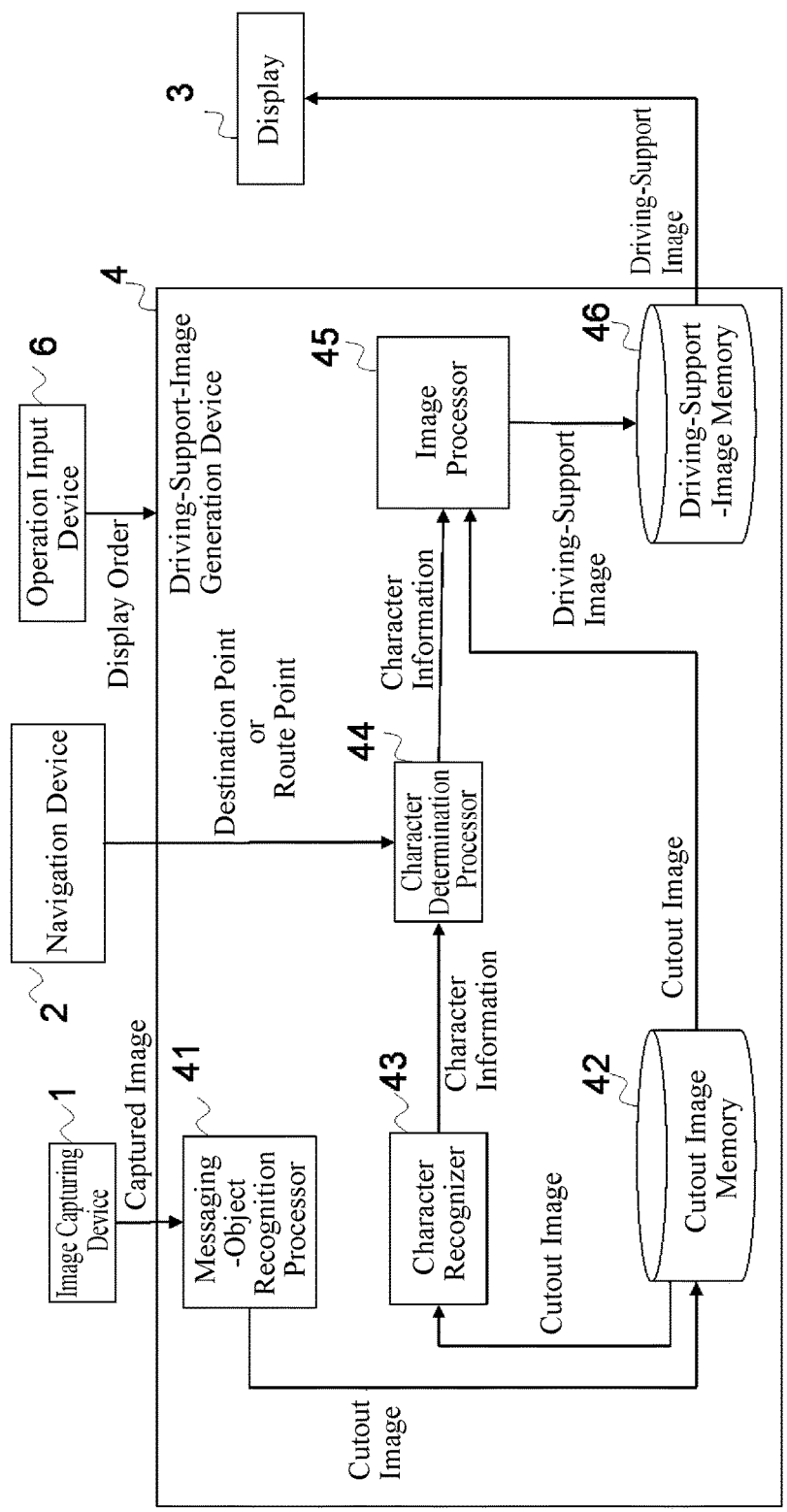
FIG. 2 is a configuration diagram of the driving-support-image display system according to Embodiment 1, which is a diagram in which a configuration of a driving-support-image generation device is shown in detail.

Here, a configuration of the driving-support-image generation device 4 will be described in detail using FIG. 2. FIG. 2 is a configuration diagram of the driving-support-image display system according to Embodiment 1, in which the driving-support-image generation device 4 is shown in detail.

The driving-support-image generation device 4 includes a messaging-object recognition processor 41, a cutout image memory 42, a character recognizer 43, a character determination processor 44, an image processor 45 and a driving-support-image memory 46. Note that the messaging-object recognition processor 41, the character recognizer 43, the character determination processor 44 and the image processor 45 shown in FIG. 2, may be configured by hardware, or may be established by causing a computer to implement specified programs.

Figure 3:
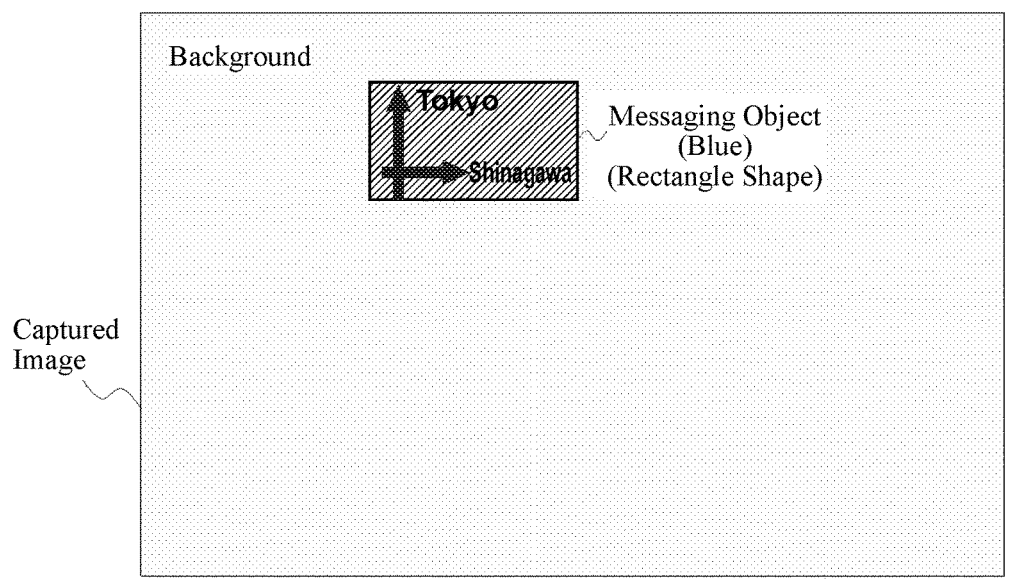
FIG. 3 is a diagram illustrating pattern matching by a messaging-object recognition processor according to Embodiment 1.

The messaging-object recognition processor 41 recognizes the messaging object from the captured image acquired by the image capturing device 1, and cuts out an area corresponding to the messaging object. For recognition of the messaging object, a pattern matching or like method is used. Specifically, in the messaging-object recognition processor 41, information related to messaging objects are registered beforehand, and the captured image acquired from the image capturing device 1 is collated with a shape and color of each of the registered messaging objects, to thereby recognize the messaging object. For example, when a captured image including a messaging object in a blue rectangle shape as shown in FIG. 3 has been captured by the image capturing device 1, the messaging-object recognition processor 41 retrieves a blue and rectangle one from among the patterns of the messaging objects registered beforehand. When a pattern corresponding to the blue and rectangle shape is extracted as the result of retrieval, the messaging-object recognition processor 41 recognizes that the object in a blue rectangle shape in the captured image is a messaging object. When recognized the messaging object, the messaging-object recognition processor 41 cuts out a graphic area where the messaging object has been recognized. Note that, in the following description, the image cut out from the captured image by the messaging-object recognition processor 41 is referred to as a cutout image.

The cutout image memory 42 stores therein information of the cutout image cut out by the messaging-object recognition processor 41. Note that the messaging-object recognition processor 41 stores an identifier and information of the cutout image to be associated together. The identifier is information for identifying the stored image, which may be, for example, a clock time at the time of capturing, a location of the vehicle at the time of capturing, a number indicative of the order of capturing, or the like. Hereinafter, it is assumed that the cutout image can be identified using the identifier when information exchange of the cutout image is performed in the processing by the driving-support-image display system.

The character recognizer 43 reads out the information of the cutout image from the cutout image memory 42, to thereby recognize characters in the cutout image. For recognition of the characters, for example, a technology of OCR (Optical Character Recognition) in which a character is identified by collating it with patterns of characters stored beforehand, or the like, is used. The character recognizer 43 outputs character information of the recognized characters to the character determination processor 44. Here, the character information is information about the characters recognized by the character recognizer 43, which includes the characters represented in the cutout image, the existing position of the characters in the cutout image, the identifier of the cutout image. Accordingly, by using the character information, the respective components of the driving-support-image display system can identify the characters, the position of the characters, and the cutout image in which the characters are represented.

Note that the timing at which the character recognizer 43 reads out the cutout image from the cutout image memory 42 may be a timing at which the passenger operates an operation input device 6 that will be described later, or may be a timing at which the cutout image is stored by the messaging-object recognition processor 41 into the cutout image memory 42. Further, in the case where a plurality of cutout images are being stored in the cutout image memory 42, the character recognizer 43 may read out the newest cutout image, or may be configured to read out, when the passenger specifies a time or a place using the operation input device 6, the cutout image associated with an identifier indicative of the time or the place.

The character determination processor 44 determines whether or not the content of the characters recognized by the character recognizer 43 corresponds to the destination point or route point set in the navigation device 2. When the characters recognized by the character recognizer 43 correspond to the destination point or route point set in the navigation device 2, the character determination processor 44 outputs the character information of the corresponding characters to the image processor 45.

The method of determining whether or not the characters recognized by the character recognizer 43 correspond to the destination point or route point is performed, for example, in such a manner that the characters recognized by the character recognizer 43 are determined to be or not to be included in the characters set in the navigation device 2. Note that the determination method is not limited thereto and just has to be a method that can determine whether the characters are corresponding or not. For example, it is allowable that, when the characters recognized by the character recognizer 43 are matched in a specific ratio to the characters of the setup destination point or route point, the characters are determined to be corresponding.

Upon receiving the character information from the character determination processor 44, the image processor 45 modifies the content of the cutout image. The "modify"

herein referred to, means to change a content of the image of the captured messaging object, such as, a character highlighting, an addition of highlighted indication, a character rewriting, an image-quality change of the cutout image, a color change, or the like. Further, examples of the character highlighting include an increase in character size, a change in character brightness, a change in character color, a character blinking, and the like. Meanwhile, the image processor 45 stores information of the cutout image after modification into the driving-support-image memory 46. Note that, in the following description, the cutout image after modification by the image processor 45 is referred to as a driving-support image.

Further, information of the driving-support image to be stored in the driving-support-image memory 46 is made identifiable by being stored as associated with the same identifier as that for the information of the cutout image before modification; thus, it is stored in the driving-support-image memory 46 so that the driving-support image can be identified about which cutout image it has been modified from.

The operation input device 6, when operated by the passenger, causes the driving-support image stored in the driving-support-image memory 46 to be displayed on the display 3. The operation input device 6 is placed in the vehicle shown in FIG. 1, and is connected to the driving-support-image generation device 4 shown in FIG. 2 by wire or wirelessly. Further, the operation input device 6 may be, for example, operation buttons, an instrument panel, or a touch panel that is given as a display of the navigation device 2 or the like, and thus, may be that which can give an order to display a driving-support image, according to an operation by the passenger.

Figure 4:
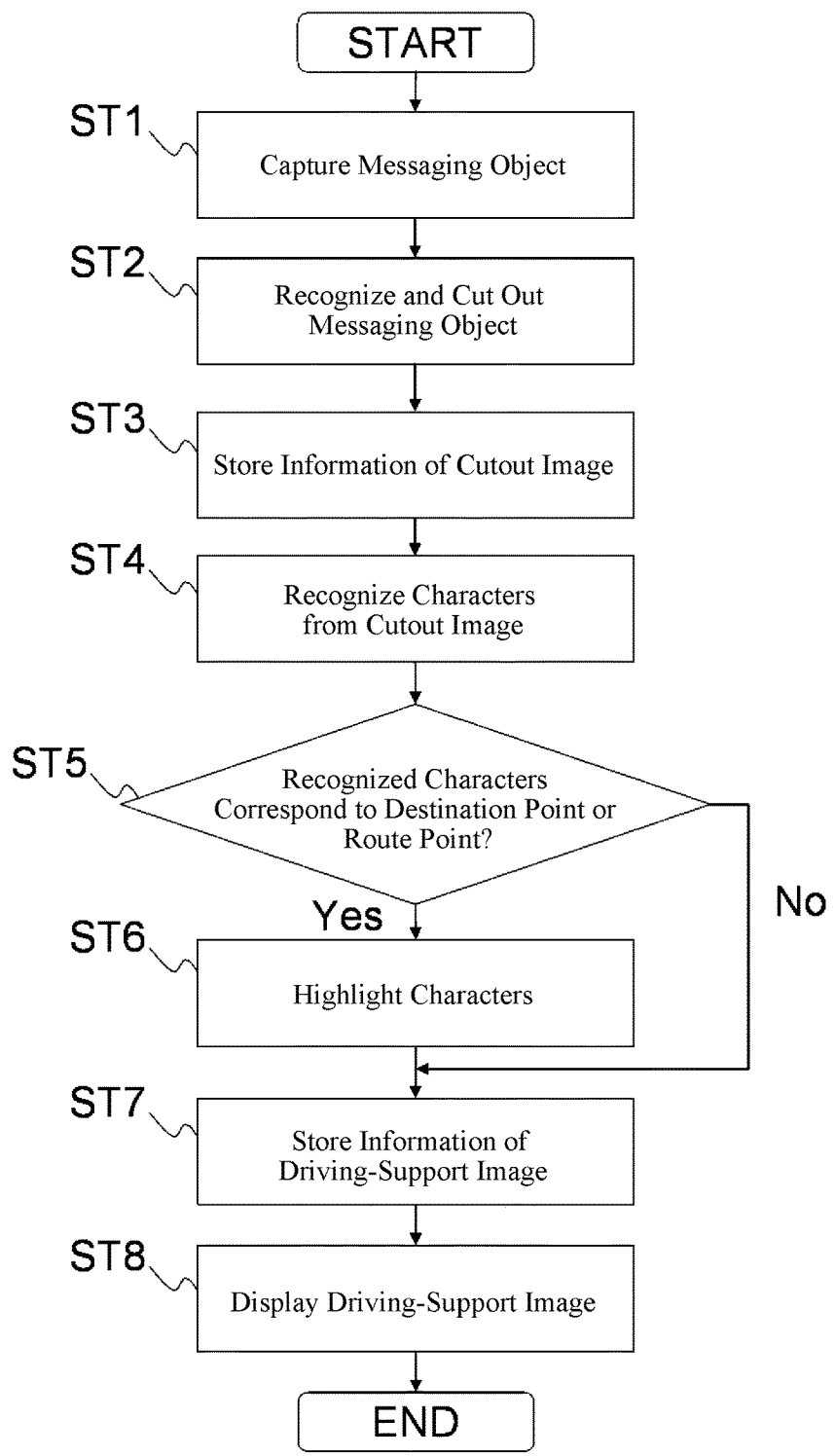
FIG. 4 is an operation flowchart of the driving-support-image display system according to Embodiment 1.
Figure 5:
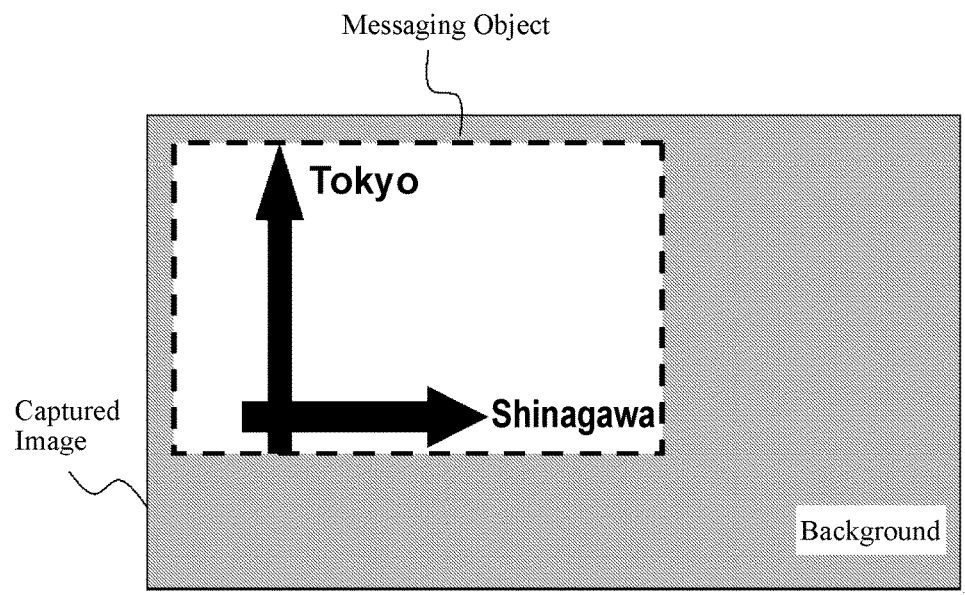
FIG. 5 is an example of a captured image captured by an image capturing device according to Embodiment 1.
Figure 6:
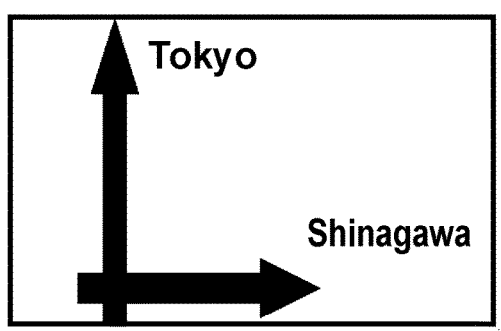
FIG. 6 is an example of a cutout image cut out by the messaging-object recognition processor according to Embodiment 1.
Figure 7:
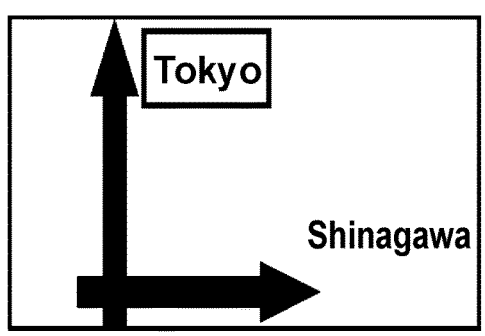
FIG. 7 is an example of a cutout image after modification to highlight characters by an image processor according to Embodiment 1.
Figure 8:
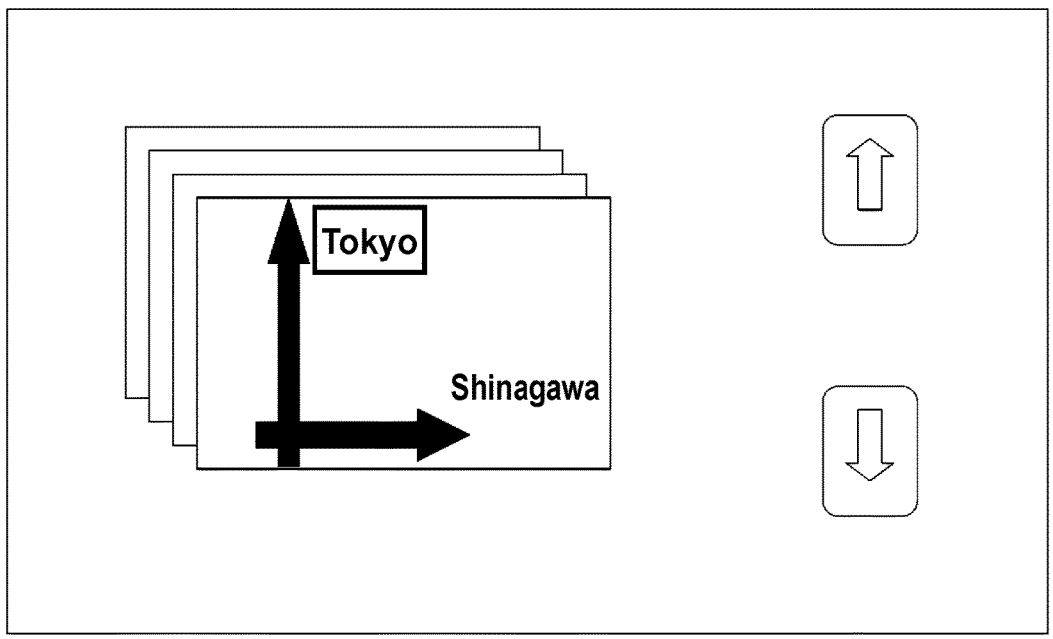
FIG. 8 is an example of a driving-support-image selection screen displayed on a display according to Embodiment 1.

In the following, operations of the driving-support-image display system according to Embodiment 1 (processing steps after ST2, by a program according to Embodiment 1) will be described using FIG. 4 to FIG. 8. FIG. 4 is an operation flowchart of the driving-support-image display system according to Embodiment 1. FIG. 5 is an example of the captured image captured by the image capturing device according to Embodiment 1. FIG. 6 is an example of the cutout image cut out by the messaging-object recognition processor according to Embodiment 1. FIG. 7 is an example of the cutout image after modification to highlight the characters by the image processor according to Embodiment 1. FIG. 8 is an example of a driving-support-image selection screen displayed on the display according to Embodiment 1. Note that, in the following description, it is assumed that the passenger in the vehicle has set "Tokyo Station" as a destination point in the navigation device 2, and is on the way to Tokyo Station.

In ST1 in FIG. 4, the image capturing device 1 captures a messaging object posted on a road or around a road. In the description of the operations of the driving-support-image display system according to this embodiment, it is assumed that the image capturing device 1 has captured the messaging object to thereby obtain the captured image exemplified in FIG. 5. Note that the hatched area in FIG. 5 is a background other than the area of the messaging object. Further, shown within a broken-line section in FIG. 5 is the messaging object. Further note that, in this case, the messaging object is a signpost for indicating to the passenger in the vehicle, a building, a place name or a direction to an area. The image capturing device 1 outputs the information of the captured image having been captured, to the driving-support-image generation device 4.

In ST2, the messaging-object recognition processor 41 acquires the information of the captured image from the image capturing device 1 to thereby recognize the messaging object by pattern matching. Further, the messaging-object recognition processor 41 cuts out the area of the messaging object (within the broken-line section in FIG. 5) having been recognized to be a messaging object by pattern matching, to obtain the cutout image (FIG. 6).

In ST3, the messaging-object recognition processor 41 stores the information of the cutout image into the cutout image memory 42.

In ST4, the character recognizer 43 reads out the information of the cutout image from the cutout image memory 42. Further, the character recognizer 43 recognizes the characters in the cutout image to obtain the character information. Specifically, the character recognizer 43 recognizes the characters "Tokyo" and "Shinagawa" in the cutout image shown in FIG. 5, and also obtains information of the positions in the cutout image of the recognized characters. The character recognizer 43 outputs the character information including the recognized characters and the position information of the characters, to the character determination processor 44.

In ST5, the character determination processor 44 receives from the navigation device 2, character information related to the destination point of "Tokyo Station" set in the navigation device 2. Further, the character determination processor 44 compares the destination point "Tokyo Station" set in the navigation device 2 with the characters "Tokyo" and "Shinagawa" represented by the character information received from the character recognizer 43. Since the characters "Tokyo" represented by the character information received from the character recognizer 43 is included in the destination point "Tokyo Station" set in the navigation device 2, the character determination processor 44 determines that the destination point of the vehicle corresponds to the characters represented on the messaging object, and then outputs the character information of the characters "Tokyo" including information of their positions in the image, to the image processor 45. Subsequently, the driving-support-image display system executes processing in ST6 that will be described later. Note that the driving-support-image display system, when the characters recognized by the character recognizer 43 are not included in the destination point or route point set in the navigation device 2, executes processing in ST7.

In ST6, upon receiving the character information related to the characters "Tokyo" from the character determination processor 44, the image processor 45 reads out the information of the cutout image from the cutout image memory 42. Further, the image processor 45 modifies the cutout image having been read out. For example, as shown in FIG. 7, the image processor 45 encloses the characters "Tokyo" in the cutout image with a frame to thereby highlight them. When the cutout image is partly modified in this manner, the modified portion stands out, so that it is possible to cause the passenger to promptly recognize the portion to be emphasized for him/her. Note that, because of the position information of the characters included in the character information, the image processor 45 can recognize at what positions in the cutout image, the characters to be modified are existing.

In ST7, the image processor 45 stores the information of the cutout image after modification into the driving-support-image memory 46, as information of a driving-support image. Further, when it is determined in ST5 by the character determination processor 44 that the recognized characters are not included in the destination point or route point set in the navigation device 2, the image processor 45 does not modify the cutout image and stores it without change into the driving-support-image memory 46 as a driving-support image.

In ST8, when the operation input device 6 is operated by the passenger, the driving-support-image generation device 4 reads out the information of the driving-support image from the driving-support-image memory 46, and outputs it to the display 3. Upon receiving the information of the driving-support image from the driving-support-image generation device 4, the display 3 displays the driving-support-image.

Note that the driving-support-image display system according to Embodiment 1 can repeatedly execute the operations from ST1 to ST7, to thereby store information of a plurality of driving-support images into the driving-support-image memory 46. In the case where the information of the plurality of driving-support images is stored, the driving-support-image display system displays the plurality of driving-support images as shown in FIG. 8. From among the displayed plurality of driving-support images, the passenger selects the driving-support image that he/she wants to display. Further, the display 3 displays the selected driving-support image. Accordingly, the passenger can select information of the necessary driving-support image in the driving-support-image selection screen displayed on the display 3, to display it on the display 3. The same also applies with respect to the following embodiments.

Further, in the case where the driving-support-image display system according to this embodiment repeatedly executes the operations from ST1 to ST7, to thereby store information of the plurality of driving-support images into the driving-support-image memory 46, an ending operation can be set by a designer of the driving-support-image display system, to be applied when the driving-support-image display system is suspended by the passenger, when the vehicle reaches the destination point, or likewise.

Note that in the description of the driving-support-image display system according to this embodiment, a case has been shown where the messaging object is a signpost; however, the object is not limited thereto, and may be a notice object on which represented is a character indicative of an area, a place name, a building name or the like, which would be set in the navigation device 2. For example, the messaging object may be a billboard on which a shop name of a shop is represented, or the like. In this case, the driving-support-image display system displays a driving-support image in which the character in the messaging object corresponding to the name of the shop set in the navigation device 2 is highlighted.

Further, the driving-support-image display system according to Embodiment 1 is configured so that the driving-support image stored in the driving-support-image memory 46 is displayed on the display 3 when the passenger operates the operation input device 6; however, this is not limitative, and the driving-support image may be automatically displayed at a constant time interval. The same also applies with respect to the following embodiments.

As described above, the driving-support-image display system according to Embodiment 1 displays, among the characters represented in the messaging object, the characters corresponding to the destination point or the route point of the host vehicle, after modification, so that it is possible to provide a driving-support image matched to a situation of the host vehicle, and to cause the passenger to promptly recognize the destination point or the route point.

Embodiment 2

A driving-support-image display system according to Embodiment 2 is characterized in that it modifies characters indicative of a distance and represented on the captured messaging object, on the basis of a travel distance due to traveling of a vehicle. In this embodiment, a location of the vehicle which is provided as information related to the characters indicative of the distance and represented on the messaging object is used as the driving-support information.

Figure 9:
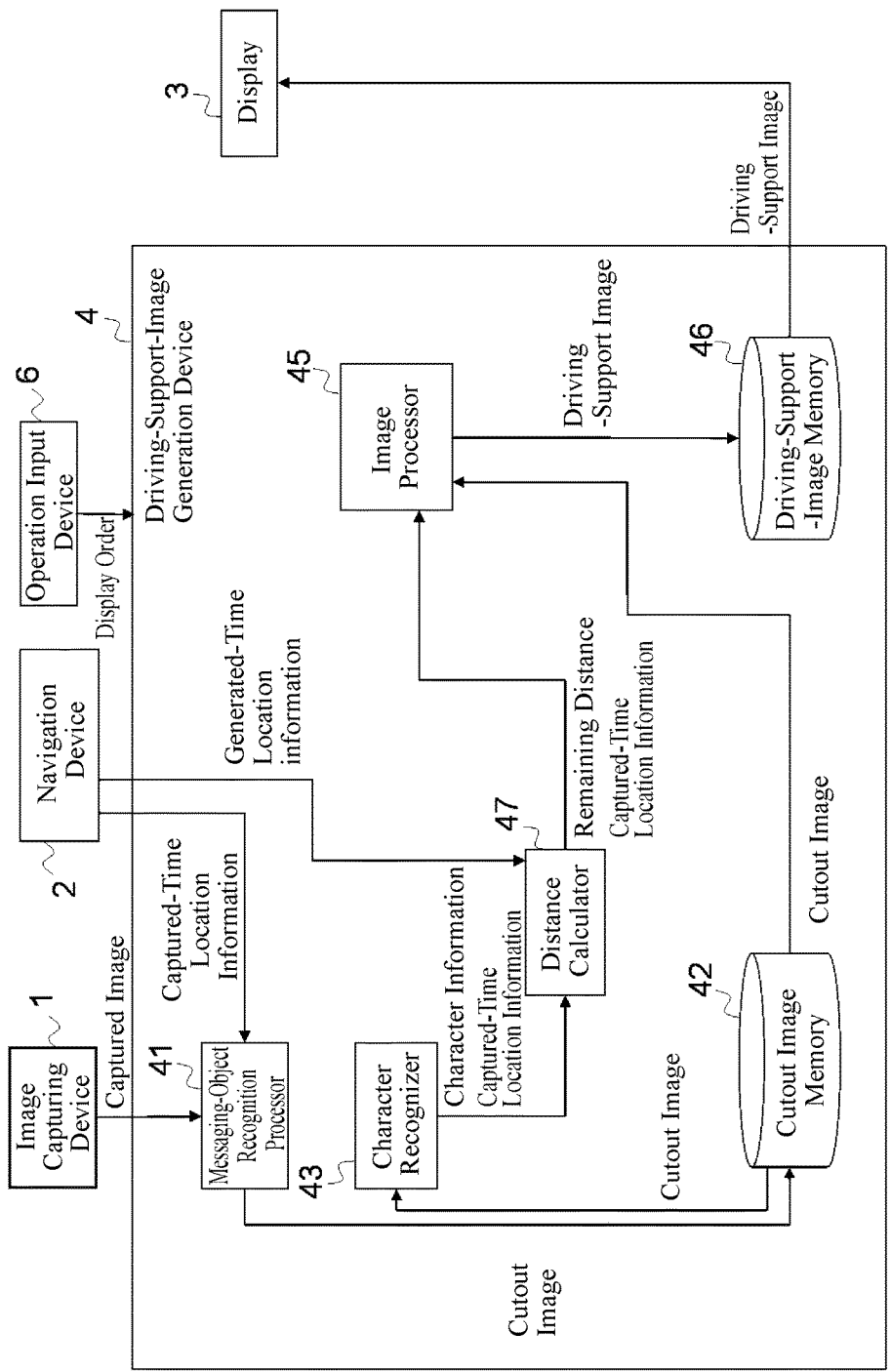
FIG. 9 is a configuration diagram of the driving-support-image display system according to Embodiment 2, which is a diagram in which a configuration of a driving-support-image generation device is shown in detail.
Figure 10:
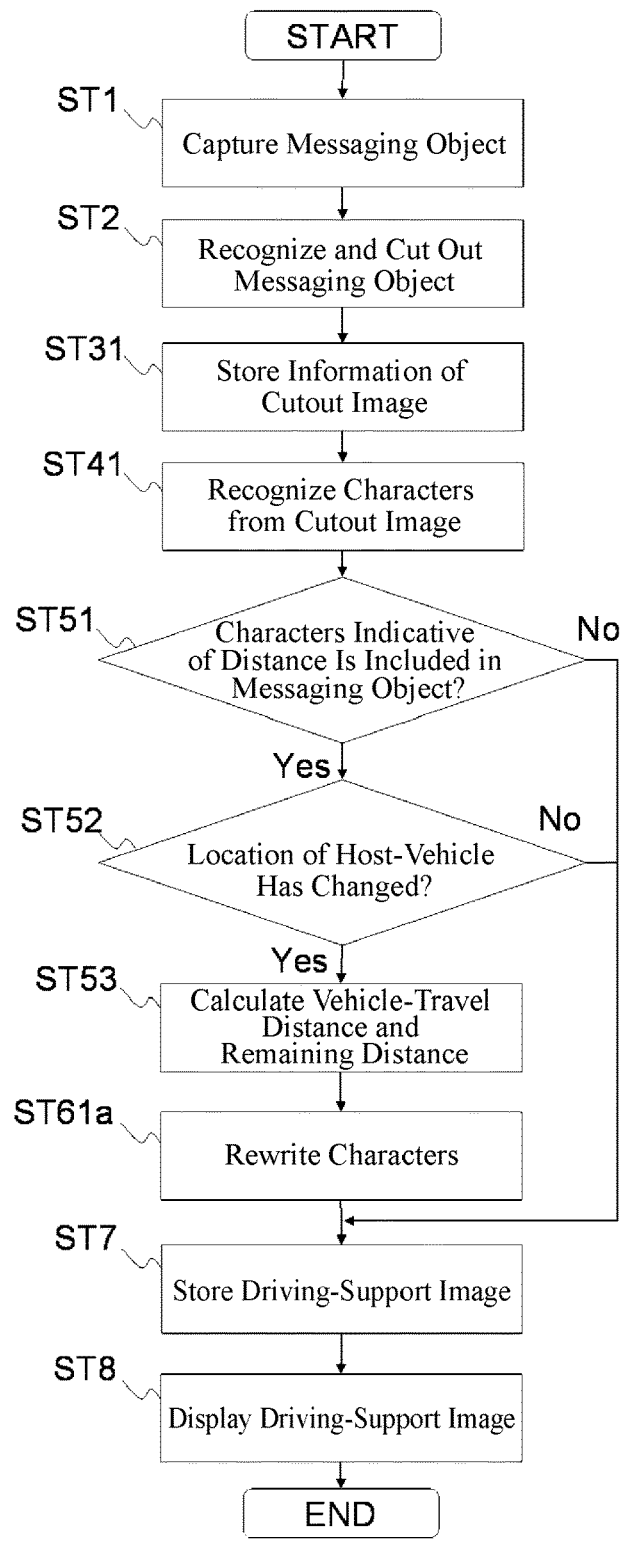
FIG. 10 is an operation flowchart of the driving-support-image display system according to Embodiment 2.
Figure 11:
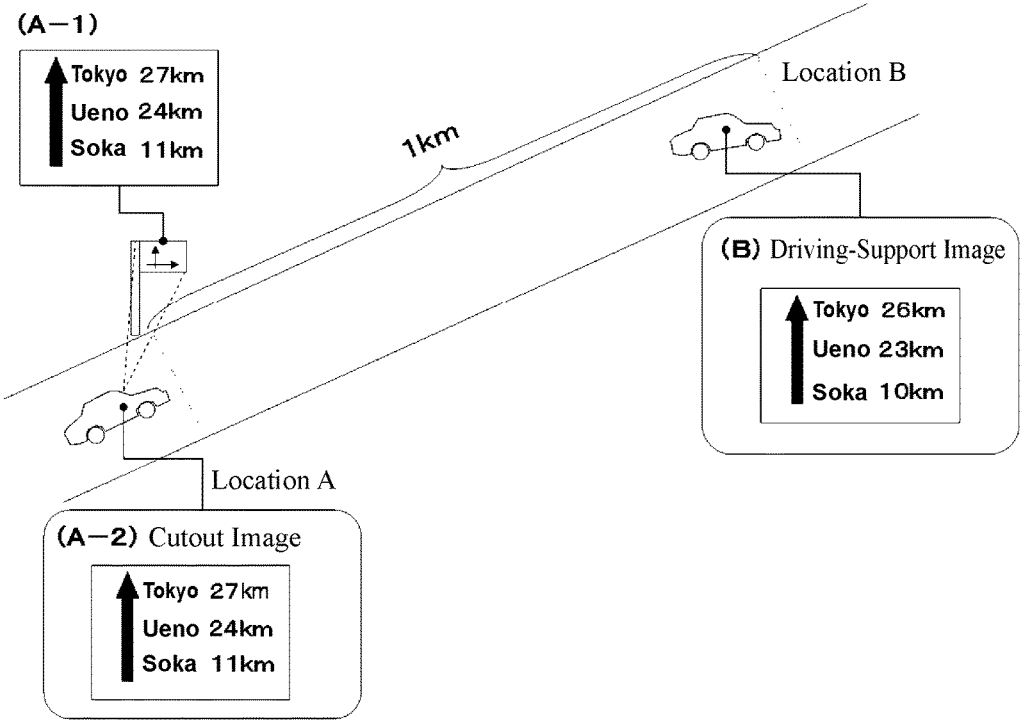
FIG. 11 is a diagram illustrating a relationship between a vehicle-travel distance and a driving-support image to be generated, in the driving-support-image display system according to Embodiment 2.
Figure 12:
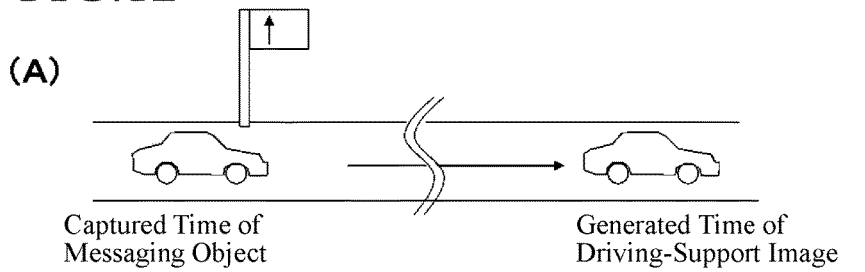
FIG. 12 is diagrams illustrating preconditions in which the driving-support-image display system according to Embodiment 2 operates.
Figure 12:
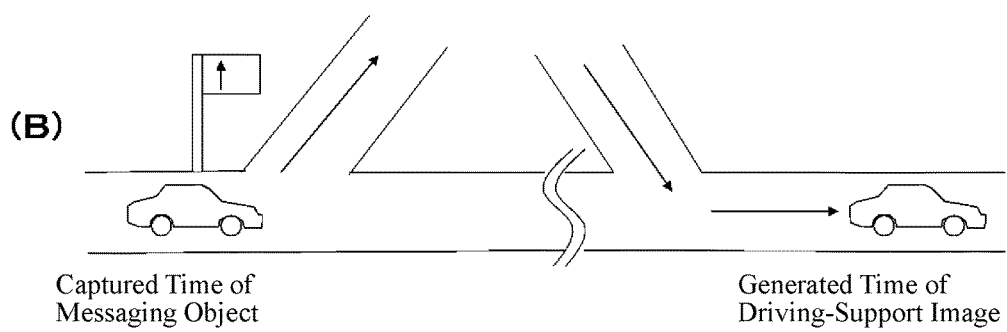

In the following, the driving-support-image display system according to Embodiment 2 will be described using FIG. 9 to FIG. 12. FIG. 9 is a configuration diagram of the driving-support-image display system according to Embodiment 2, which is a diagram in which a configuration of a driving-support-image generation device is shown in detail. FIG. 10 is an operation flowchart of the driving-support-image display system according to Embodiment 2. FIG. 11 is a diagram illustrating a relationship between a vehicle-travel distance and a driving-support image to be generated, in the driving-support-image display system according to Embodiment 2. FIG. 12 is diagrams illustrating preconditions in which the driving-support-image display system according to Embodiment 2 operates.

The configuration of the driving-support-image display system according to Embodiment 2 will be described using FIG. 9 as follows. Note that with respect to the description of FIG. 9, the same reference numerals as in FIG. 1 and FIG. 2 are given to the parts equivalent to those in the configuration of the driving-support-image display system of Embodiment 1, so that their description is omitted here.

The driving-support-image generation device 4 according to Embodiment 2 is provided with a distance calculator 47. Note that the distance calculator 47 shown in FIG. 9 may be configured by hardware, or may be established by causing a computer to implement a specified program.

When the characters indicative of the distance exist in the characters recognized by the character recognizer 43, the distance calculator 47 calculates a vehicle-travel distance on the basis of captured-time location information and generated-time location information that are acquired from the navigation device 2. The captured-time location information is information indicative of a location of the vehicle at the time the captured image was captured. Namely, the captured time location is nearly the same as a location where the messaging object is posted. Further, the generated-time location information is information indicative of a location of the vehicle at the time the driving-support image related to the captured messaging object was generated. Furthermore, the vehicle-travel distance is a distance from the location represented by the captured-time location information until the location represented by the generated-time location information, and indicates a moved distance of the vehicle. In addition, the distance calculator 47 subtracts the vehicle-travel distance from a numerical value of the characters indicative of the distance in the characters recognized by the character recognizer 43, to thereby calculate a distance (hereinafter, referred to as a remaining distance) remaining from the location of the vehicle at the time the driving-support image is generated until a specific place represented on the messaging object. Here, the specific place means a place which will be reached when the vehicle travels the distance represented on the messaging object, such as, a named place in the signpost represented together with the characters indicative of the distance on the messaging object, a parking place represented on a billboard of a shop, or the like. In the following description, the captured-time location information and the generated-time location information are referred collectively to as location information of the vehicle.

In the following, operations of the driving-support-image display system according to Embodiment 2 (processing steps after ST2, by a program according to Embodiment 2) will be described using FIG. 10 and FIG. 11. Note that with respect to the description of FIG. 10, the same numerals as in FIG. 4 are given to the steps equivalent to those in the operations of the driving-support-image display system according to Embodiment 1, so that their description is omitted here. Further, it is assumed that, in ST1 and ST2, the driving-support-image display system captures, at Location A, a messaging object shown at (A-1) in FIG. 11, to thereby generate a cutout image shown at (A-2) in FIG. 11. Note that the messaging object (A-1) is a signpost indicative of a distance up to a place indicated by a place name, or the like. Further, the cutout image (A-2) is a cutout image obtained by capturing the messaging object (A-1) followed by cutting out.

In ST31, the cutout image memory 42 obtains the captured-time location information from the navigation device 2 to thereby store into the cutout image memory 42, the information of the cutout image and the captured-time location information to be associated together.

In ST41, the character recognizer 43 acquires the information of the cutout image from the cutout image memory 42. Further, the character recognizer 43 recognizes from the cutout image, the characters "Tokyo", "27 km", "Ueno", "24 km", "Soka" and "11 km". Furthermore, the character recognizer 43 acquires the captured-time location information associated with the information of the cutout image.

In ST51, the distance calculator 47 determines whether or not the characters indicative of the distance are represented on the messaging object. Specifically, upon receiving the character information of the characters "Tokyo", "27 km", "Ueno", "24 km", "Soka" and "11 km" from the character recognizer 43, the distance calculator 47 determines whether or not there exist the characters indicative of a number or a unit of distance. In the case of this example, because of receiving the character information related to the characters "27 km", "24 km" and "11 km" from the character recognizer 43, the distance calculator 47 determines that the characters indicative of the distance are represented on the messaging object, to thereby execute processing in ST52. Meanwhile, when it is determined by the distance calculator 47 that no characters indicative of the distance exist in the cutout image, the driving-support-image generation device 4 executes processing in ST7.

In ST52, the distance calculator 47 determines whether the host-vehicle location has changed or not. Specifically, the distance calculator 47 receives the generated-time location information from the navigation device 2. Further, the distance calculator 47 compares the captured-time location information received from the character recognizer 43 with the generated-time location information received from the navigation device 2 to thereby confirm whether or not there is a change therebetween, and determines, when there is a change, that the host-vehicle location has changed. The distance calculator 47, when determined that the host-vehicle location has changed, executes processing in ST53. Meanwhile, when it is determined by the distance calculator 47 that there is no change in the host-vehicle location, the driving-support-image generation device 4 executes processing in ST7. Note that the distance calculator receives the generated-time location information at a predetermined time interval from the navigation device 2. The "predetermined time interval" herein referred to, is a time interval that is pre-set in the distance calculator 47, and is a value that can be arbitrarily set by the designer of the driving-support-image display system of this embodiment. In the following description, it is assumed that, as shown in FIG. 11, the distance calculator 47 receives at Location B, the generated-time location information from the navigation device 2.

In ST53, using the captured-time location information and the generated-time location information, the distance calculator 47 calculates a vehicle-travel distance "1 km" that is from the location (Location A) represented by the captured-time location information until the location (Location B) represented by the generated-time location information. Note that, for the vehicle-travel distance, it suffices to use a method generally applied to calculate a moving distance between two points.

Further, the distance calculator 47 subtracts the vehicle-travel distance "1 km" from each of "27 km", "24 km" and "11 km" of the characters recognized by the character recognizer 43, to thereby calculate remaining distances "26 km", "23 km" and "10 km". Furthermore, the distance calculator outputs information related to the calculated remaining distances to the image processor 45. Note that it is assumed that the information related to the remaining distances includes information of positions of the characters "27 km", "24 km" and "11 km" in the cutout image.

In ST61a, upon receiving the information related to the remaining distances and the captured-time location information serving as an identifier from the distance calculator 47, the image processor 45 reads out the information of the cutout image identifiable by the captured-time location information, from the cutout image memory 42 followed by modifying it. Specifically, the image processor 45 rewrites the characters "27 km", "24 km" and "11 km" in the cutout image with those of the remaining distances "26 km", "23 km" and "10 km", respectively. Shown at (B) in FIG. 11 is a driving-support image after rewriting by the image processor 45.

Note that, in the description of ST53 and ST61a, the driving-support-image generation device 4 calculates the remaining distances using the distance calculator 47 and rewrites the characters indicative of the distances in the cutout image on the basis of the distances using the image processor 45; however, the image processor 45 may calculate the remaining distances on the basis of the vehicle-travel distance calculated by the distance calculator 47 to thereby rewrite the characters indicative of the distances.

In ST7 and ST8, as similar to the processing described using FIG. 4, the image processor 45 stores the information of the driving-support image thus generated into the driving-support-image memory 46, and the display 3 reads out, when the operation input device 6 is operated by the passenger, the information of the driving-support image from the driving-support-image memory 46 to thereby display that image.

Note that the driving-support-image display system according to Embodiment 2 may be configured to read out, after completion of ST7, the driving-support image stored in the driving-support-image memory 46, to then repeatedly execute the operations similar to those in ST51 to ST7 for that driving-support image, and to rewrite the characters indicative of the distance and represented in the driving-support image according to the vehicle-travel distance. Namely, the driving-support-image display system may read out the driving-support image stored in the driving-support-image memory 46 in response to traveling of the vehicle, to calculate the vehicle-travel distance on the basis of the generated-time location information acquired at the time the driving-support image was generated in ST52 and other generated-time location information than said generated-time location information at the time the vehicle has further traveled beyond the location thereof, to thereby rewrite the characters in the driving-support image. The driving-support-image display system according to Embodiment 2 may be configured to terminate processing after executing the above processing repeatedly a predetermined number of times, or may be configured to terminate processing when a new captured image is acquired by the image capturing device 1, namely, a newest messaging object is captured.

Further, it may be configured, in the case where the driving-support image is read out from the driving-support-image memory 46 and is further subjected to rewriting, to rewrite that image by acquiring the travel distance of the vehicle from another measurement means.

Meanwhile, in the description of ST52, the distance calculator 47 receives the generated-time location information at a predetermined time interval from the navigation device 2; however, it is not limited thereto, and may be configured to make access to the navigation device 2 at the time of receiving the character information from the character recognizer 43 to thereby acquire the generated-time location information. Further, the distance calculator 47 may acquire the generated-time location information when the operation input device 6 is operated.

Further, in the description of the driving-support-image display system according to Embodiment 2, a case of capturing a signpost is applied; however, what is captured is not limited to the signpost, and it is just has to be a messaging object by which a distance until a specific place is represented.

By the way, the driving-support-image display system according to Embodiment 2 is based at least on that the road on which the vehicle is traveling at the time of capturing the messaging object is the same as the road on which the vehicle is traveling at the time of generating the driving-support image. For example, as shown at (A) in FIG. 12, in the case where the vehicle travels along the road on which it was traveling at the time of capturing the messaging object, and, also at the time of going to generate a driving-support image, the vehicle is traveling on the road on which the messaging is posted, the driving-support-image generation device 4 can generate the driving-support image. Further, as shown at (B), even in the case where the vehicle deviates from the road on which it was traveling at the time of capturing the messaging object, when, at the time of going to generate a driving-support image, the vehicle has returned to the road on which the messaging is posted, the driving-support-image display system can also generate the driving-support image.

As described above, the driving-support-image display system according to Embodiment 2, when an image of a messaging object on which the characters indicative of the distance is represented is to be displayed, displays an image of the messaging object in which the represented distance is modified according to the travel distance of the vehicle, as the driving-support image. Thus, in the case where the passenger has overlooked the messaging object on which a distance until a specific place is represented, when the passenger reviews the image of the messaging object after the vehicle travels a little farther, he/she can recognize the distance from the current location until the specific place.

Embodiment 3

A driving-support-image display system according to Embodiment 3 is characterized in that it captures a messaging object indicative of a distance until a branch point of a road, such as an intersection, a turn or the like, to thereby generate a driving-support image in which characters indicative of the distance are rewritten according to a fact of passing the branch point. Also in this embodiment, a location of the vehicle which is provided as information related to the characters indicative of the distance is used as driving-support information.

Figure 13:
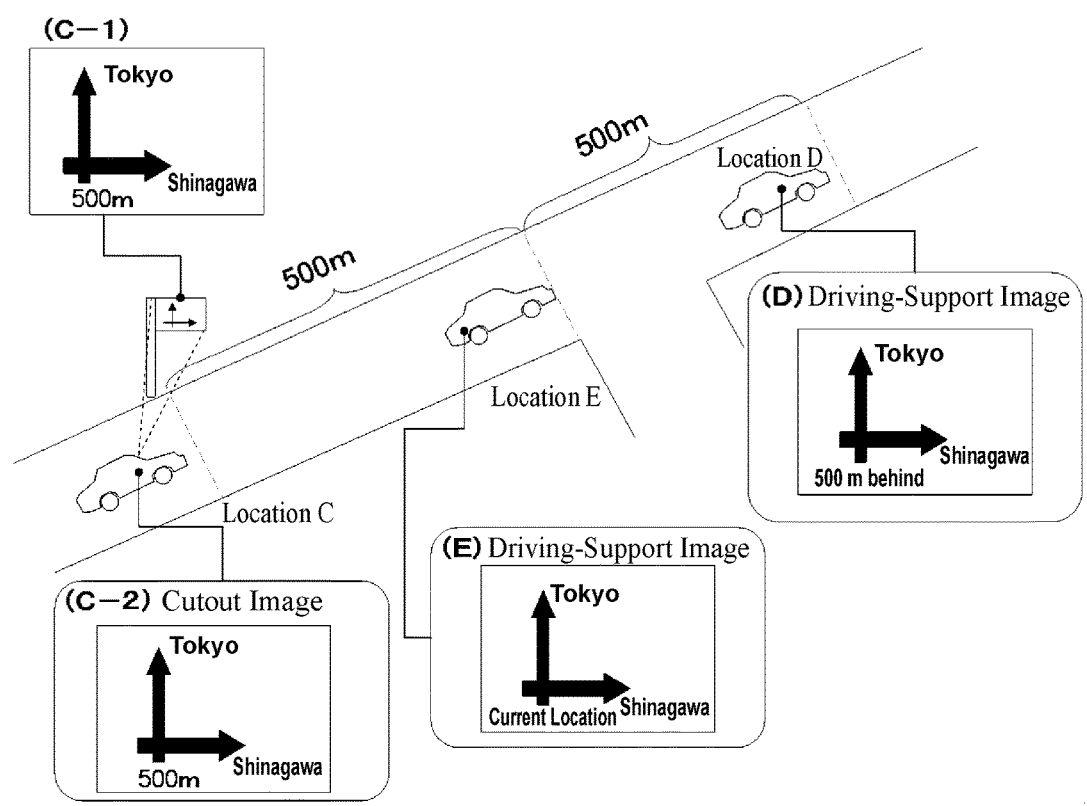
FIG. 13 is an example in which characters indicative of a distance and represented on a messaging object are rewritten by a driving-support-image display system according to Embodiment 3.
Figure 14:
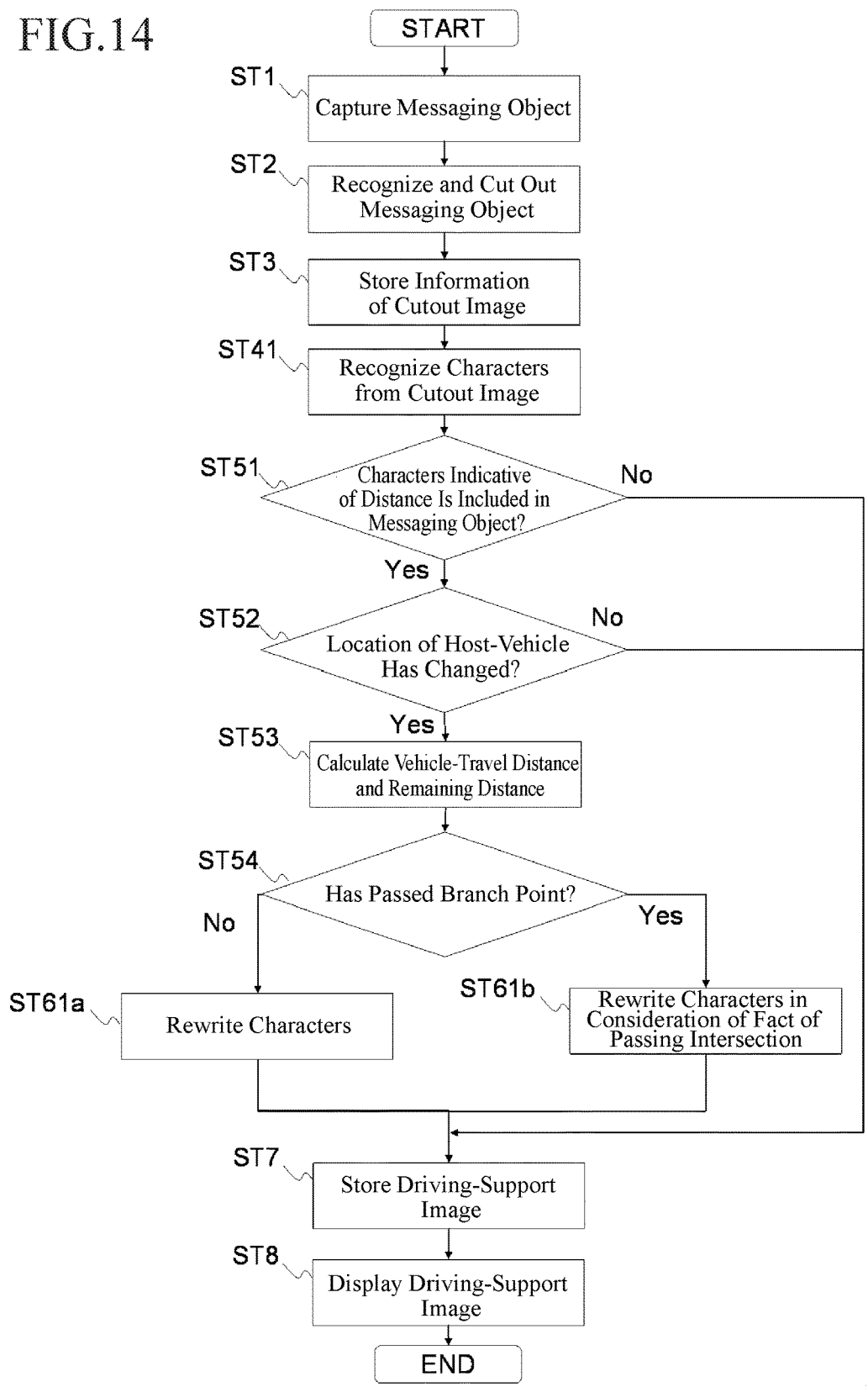
FIG. 14 is an operation flowchart of the driving-support-image display system according to Embodiment 3.
Figure 15:
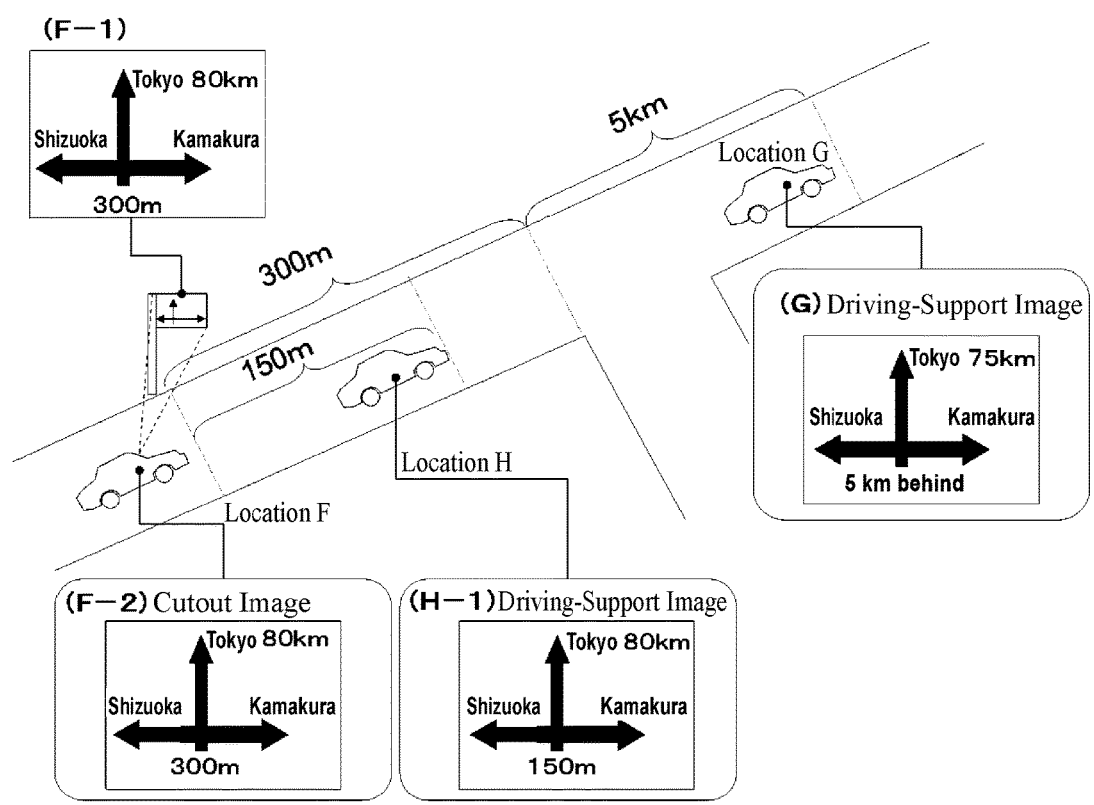
FIG. 15 is an example of the case where, in the driving-support-image display system according to Embodiment 3, a messaging object is captured on which represented are a distance until a branch point and a distance from the branch point until an area represented on the messaging object.

In the following, the driving-support-image display system according to Embodiment 3 will be described using FIG. 13 to FIG. 15. FIG. 13 is an example in which the characters indicative of the distance and represented on the messaging object are rewritten by the driving-support-image display system according to Embodiment 3. FIG. 14 is an operation flowchart of the driving-support-image display system according to Embodiment 3. FIG. 15 is an example in the case where, in the driving-support-image display system according to Embodiment 3, a messaging object is captured on which represented are a distance until a branch point and a distance from the branch point until an area represented on the messaging object.

Note that, in the following description, the same reference numerals as in FIG. 1, FIG. 2 and FIG. 9 are given to the parts equivalent to those in the configurations of the driving-support-image display systems according to Embodiment 1 and Embodiment 2, so that their description is omitted here. Further, also in the driving-support-image generation device 4 according to Embodiment 3, the distance calculator 47 shown in FIG. 9 may be configured by hardware, or may be established by causing a computer to implement a specified program. The configuration of the driving-support-image generation device 4 according to Embodiment 3 is similar to the configuration of the driving-support-image generation device 4 according to Embodiment 2, so that its detailed description is omitted here.

Further, with respect to the description of FIG. 14, the same numerals as in FIG. 4 and FIG. 10 are given to the steps equivalent to those in the operations of the driving-support-image display systems according to Embodiment 1 and Embodiment 2, so that their description is omitted here.

Note that, in the following description, it is assumed that, in ST1 to ST3, the image capturing device 1 captures a messaging object shown as an messaging object (C-1) at Location C shown in FIG. 13, and then a cutout image (C-2) is generated based on the captured image and is stored in the cutout image memory 42. Further, it is assumed that, in ST41 to ST53, upon receiving the character information of the characters "Tokyo", "Shinagawa" and "500 m" recognized by the character recognizer 43 after the cutout image (C-2) is read out from the cutout image memory 42, the distance calculator 47 determines that the characters indicative of the distance exists in the messaging object. Further, it is assumed that the vehicle equipped with the driving-support-image generation device 4 has traveled to Location D at the time of generating a driving-support image. In the following, operations of the driving-support-image display system according to Embodiment 3 (processing steps after ST2, by a program according to Embodiment 3) will be described from ST53.

In ST53, the distance calculator 47 calculates a vehicle-travel distance from Location C represented by the captured-time location information until Location D represented by the generated-time location information. In the case of this example, the vehicle-travel distance is 1000 meters.

In ST54, the distance calculator 47 determines whether or not the vehicle has passed the branch point. Specifically, the distance calculator 47 subtracts the vehicle-travel distance "1000 m" from "500 m" of the characters indicative of the distance until the branch point. At this time, the difference becomes a negative value of "−500 m". In such a case where a value that is obtained by subtracting the vehicle-travel distance from the value of the characters indicative of a distance and represented on the messaging object, becomes a negative value, the distance calculator 47 determines that the vehicle has passed the branch point. When the vehicle is determined to have passed the branch point by the distance calculator 47, the driving-support-image generator 4 executes processing in ST61b. In contrast, when the vehicle is determined not to have passed the branch point by the distance calculator 47, the driving-support-image generator 4 executes processing in ST61a.

In ST61b, upon receiving the information related to a remaining distance and the captured-time location information serving as an identifier from the distance calculator 47, the image processor 45 reads out the information of the cutout image identifiable by the captured-time location information from the cutout image memory 42. Further, the distance calculator 47 modifies the characters in the cutout image in consideration of the fact of passing the branch point. Namely, at Location D, since the vehicle is found at a location 500 meters ahead after passing the branch point, the image processor 45 generates a driving-support image in which the characters "500 m" represented on the messaging object are rewritten with "500 m behind". After generation of the driving-support image, the image processor 45 executes processing in ST7.

In ST7 and ST8, as similar to the processing described using FIG. 4 and FIG. 10, the image processor 45 stores the information of the driving-support image thus generated into the driving-support-image memory 46. Further, the display 3 reads out, when the operation input device 6 is operated by the passenger, the information of the driving-support image from the driving-support-image memory 46 to thereby display that image. After the above processing, the driving-support-image display system according to Embodiment 3 terminates its operation.

Note that, in the above description, a case is shown where a negative value is provided as the result of subtracting the vehicle-travel distance from the distance until the branch point represented on the messaging object. Meanwhile, in the case where the vehicle is found on the branch point (Location E in FIG. 13), namely, the distance until the branch point represented on the messaging object is the same as, or has a little difference from, the vehicle-travel distance, the image processor 45 may rewrite the characters represented on the messaging object with "Current Location" or "0 m" etc.

As described above, the driving-support-image display system according to Embodiment 3 determines whether or not the vehicle has passed the branch point, using the distance calculator 47, and rewrites the characters indicative of the distance in the cutout image according to the fact of passing the branch point. Thus, even with respect to the messaging object indicative of a distance until a branch point of the road, it becomes possible to provide a driving-support image matched to traveling of the vehicle to the passenger.

Further, the driving-support-image display system according to Embodiment 3 can generate a driving-support image, even with respect to the messaging object on which a distance until a branching point and a distance from the branch point until a specific place are represented as shown at (F-1) in FIG. 15.

For example, it is assumed that when the vehicle is traveling at Location F, the driving-support-image generation device 4 captures the messaging object (F-1) using the image capturing device 1, and then generates a cutout image (F-2) using the messaging-object recognition processor 41. In this case, at the time the vehicle has traveled to Location G, the driving-support-image generation device 4 generates a driving-support image (G).

A method of calculating "5 km behind" in the driving-support image (G) that is a distance until the branch point, is similar to the processing from ST1 to ST61b in FIG. 14. Meanwhile, "75 km" in the driving-support image (G) that is a distance from the branch point until the specific place, is calculated by the distance calculator 47 after subtracting "300 m", that is a distance from location F until the branch point, from "5.3 km" that is the vehicle-travel distance from Location F to Location G. Further, in the case of generating the driving-support image at the time the vehicle is traveling at Location H where the vehicle has not yet passed the branch point, namely, at the time the vehicle is traveling at a point between Location F and the branch point, it suffices for the driving-support-image generation device 4 not to rewrite "80 km" that is the distance from the branch point until the specific place of "Tokyo", as shown in a driving-support image (H-1). Note that, as described at ST54 in FIG. 14, the driving-support-image generation device 4 can determine whether or not the vehicle has passed the branch point, using the distance calculator 47.

As described above, the driving-support-image display system according to Embodiment 3 can generate a driving-support image matched to a situation of the vehicle, even with respect to a messaging object on which a distance until a branching point and a distance from the branch point until a specific place are represented, so that the passenger can recognize a content of the messaging object in a manner matched to the current situation.

Embodiment 4

Figure 16:
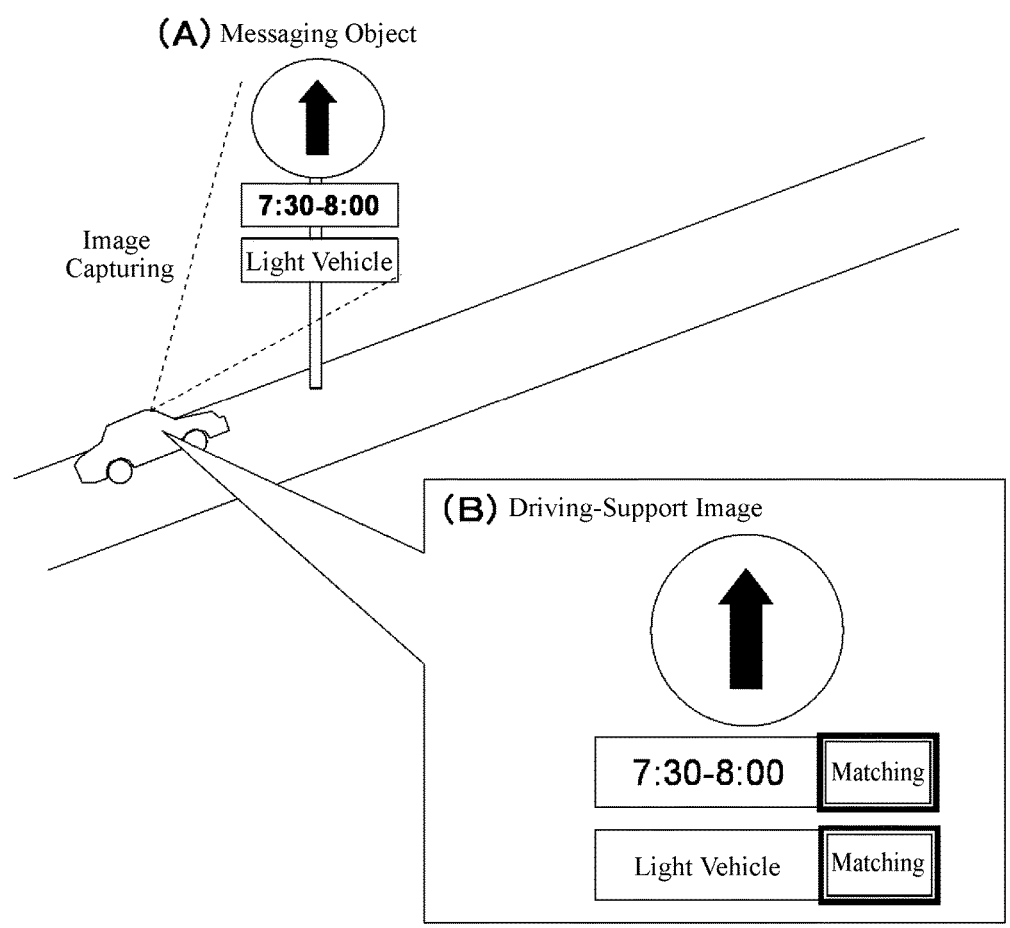
FIG. 16 is a diagram illustrating a relationship between a messaging object to be captured and a messaging object to be displayed, by a driving-support-image display system according to Embodiment 4.
Figure 17:
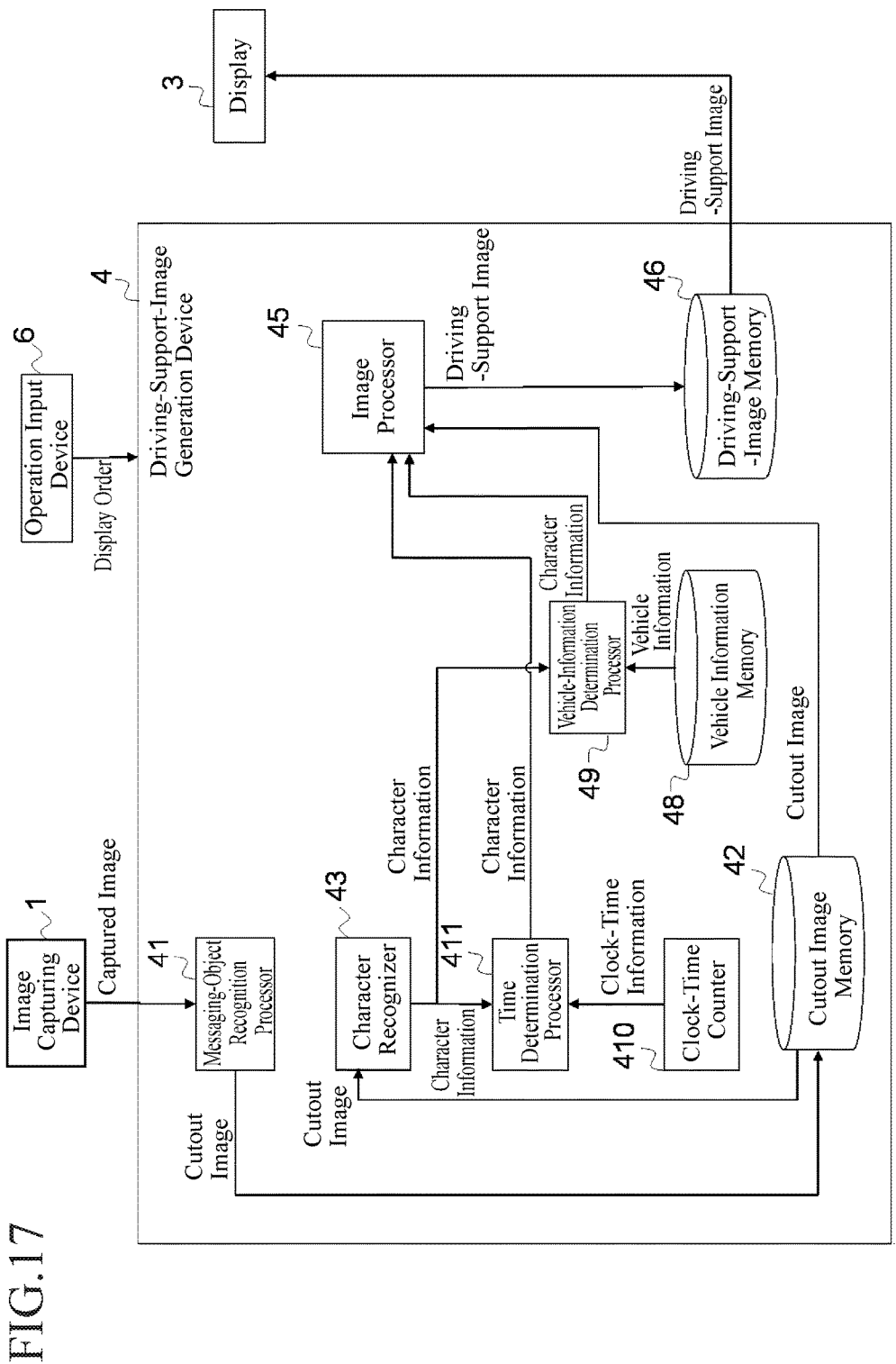
FIG. 17 is a configuration diagram of the driving-support-image display system according to Embodiment 4, which is a diagram in which a configuration of a driving-support-image generation device is shown in detail.
Figure 18:
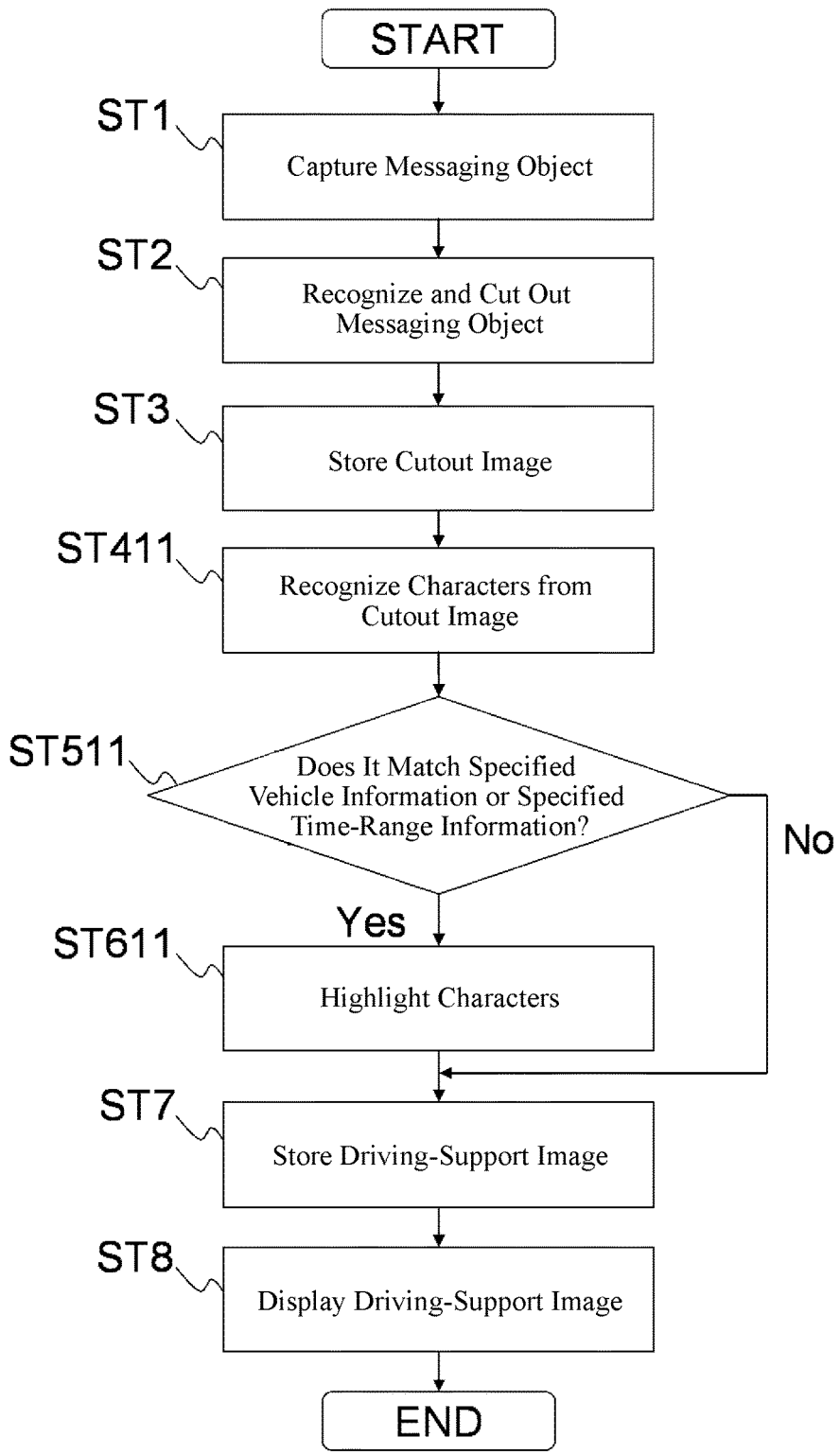
FIG. 18 is an operation flowchart of the driving-support-image display system according to Embodiment 4.

In the following, a driving-support-image display system according to Embodiment 4 will be described using FIG. 16 to FIG. 18. FIG. 16 is a diagram illustrating a relationship between a messaging object to be captured and a messaging object to be displayed, by the driving-support-image display system according to Embodiment 4. FIG. 17 is a configuration diagram of the driving-support-image display system according to Embodiment 4, which is a diagram in which a configuration of a driving-support-image generation device is shown in detail. FIG. 18 is an operation flowchart of the driving-support-image display system according to Embodiment 4. In this embodiment, vehicle information such as a vehicle type of the host vehicle, etc. or a current time, which is provided as information related to specified vehicle information or specified time-range information represented on the messaging object and to be described later, is used as the driving-support information.

The driving-support-image display system according to Embodiment 4 is characterized in that it recognizes the specified vehicle information or the specified time-range information that is provided together with a messaging object such as a regulatory sign or the like, and determines whether or not such information matches the information of the host vehicle, and then generates according to the determination result, a driving-support image in which characters in the cutout image of the captured messaging object are highlighted. Here, the specified vehicle information means information that specifies a vehicle to which the content represented on the messaging object is applied, and, for example, a vehicle type, a vehicle height, a maximum loading capacity or the like, corresponds to this information. The vehicle type means a kind of the vehicle, such as, a light vehicle, a medium-sized vehicle, a large-sized vehicle, or the like. Further, the specified time-range information means information indicative of a time range in which the content represented on the messaging object is applied. For example, indicated at (A) in FIG. 16 is a messaging object for prohibiting traveling other than in a specified direction. Further, at the under side of the messaging object, there are represented the specified vehicle information and the specified time-range information. On the road on which the messaging object (A) is posted, a light vehicle is allowed to travel only in a direction specified by an arrow in a range of "7:30-8:00".

In the following, the configuration of the driving-support-image display system according to Embodiment 4 will be described using FIG. 17. Note that, with respect to the description of FIG. 17, the same numerals as in FIG. 1, FIG. 2 and FIG. 9 are given to the parts equivalent to those in the driving-support-image display systems in Embodiment 1 to Embodiment 3, so that their description is omitted here.

The driving-support-image generation device 4 includes a vehicle information memory 48, a vehicle-information determination processor 49, a clock-time counter 410 and a time determination processor 411. Note that the vehicle-information determination processor 49, the clock-time counter 410 and the time determination processor 411 shown in FIG. 17 may be configured by hardware, or may be established by causing a computer to implement specified programs.

The vehicle information memory 48 has stored beforehand therein vehicle information of the host vehicle. The vehicle information means information related to the host vehicle and is, for example, a vehicle height, a maximum loading capacity, a vehicle type, or the like.

The vehicle-information determination processor 49 determines whether or not the host vehicle matches the specified vehicle information recognized by the character recognizer 43. Upon receiving the character information recognized by the character recognizer 43, the vehicle-information determination processor 49 reads out the vehicle information stored in the vehicle information memory 48. Further, the vehicle-information determination processor 49 outputs, when determined that the read-out vehicle information matches the content represented by the specified vehicle information, the character information received from the character recognizer 43, to the image processor 45.

The clock-time counter 410 counts the clock time. The clock-time counter 410 outputs clock-time information indicative of the current time to the time determination processor 411.

The time determination processor 411 determines whether or not the clock-time information received from the clock-time counter 410 falls within the specified time-range information recognized by the character recognizer 43. When the clock-time information falls within the specified time-range information, the time determination processor 411 outputs the character information to the image processor 45.

In the following, operations of the driving-support-image display system according to Embodiment 4 (processing steps after ST2, by a program according to Embodiment 4) will be described using FIG. 18. Note that, with respect to the description of FIG. 18, the same numerals as in FIG. 4, FIG. 10 and FIG. 14 are given to the steps equivalent to those in the operations of the driving-support-image display systems according to Embodiment 1 to Embodiment 3, so that their description is omitted here. Further, in the following description, it is assumed that, in ST1 to ST3, the driving-support-image display system captures a messaging object shown at (A) in FIG. 16 using the image capturing device 1, and recognizes the messaging object using the messaging-object recognition processor 41 to thereby generate a cutout image, followed by storing it into the cutout image memory 42. Furthermore, it is assumed that the clock time at the time the driving-support-image generation device 4 generates the driving-support image is "7:45", and the vehicle type of the host vehicle is a light vehicle.

In ST411, the character recognizer 43 reads out the information of the cutout image from the cutout image memory 42 to thereby recognize the characters from the cutout image, and then outputs: the character information of characters "Light Vehicle" to the vehicle-information determination processor 49; and the character information of characters "7:30-8:00" to the time determination processor 411.

In ST511, the vehicle-information determination processor 49 receives the character information of the characters "Light Vehicle". Further, the vehicle-information determination processor 49 refers to the vehicle type stored in the vehicle information memory 48 to compare it with the character information of the characters "Light Vehicle" received from the character recognizer 43, to thereby determine whether or not the character information matches the vehicle type. In the case of this example, because the vehicle type is "light vehicle", the vehicle-information determination processor 49 determines that the specified vehicle information matches the vehicle type of the host vehicle, to thereby output the character information of the characters "Light Vehicle" to the image processor 45.

Meanwhile, the time determination processor 411 receives the character information of the characters "7:30-8:00". Further, upon receiving clock-time information "7:45" from the clock-time counter 410, the time determination processor 411 determines whether or not the clock time "7:45" at the time of generating the driving-support image, falls within the time range represented by the specified time-range information, by comparing it with the character information of the characters "7:30-8:00" received from the character recognizer 43. In the case of this example, because the specified time-range information is "7:30-8:00" and the current time is "7:45", the current time is determined to match the specified time-range information, so that the character information is outputted to the image processor 45.

Note that, when the vehicle information does not match the specified vehicle information and the current time represented by the clock-time information does not fall within the specified time range, the driving-support-image generation device 4 executes processing in ST7.

In ST611, upon receiving the character information related to the characters "Light Vehicle" from the vehicle-information determination processor 49 and the character information related to the characters "7:30-8:00" from the time determination processor 411, the image processor 45 reads out the information of the cutout image stored in the cutout image memory 42, followed by modifying it. Specifically, it executes modifying to highlight the characters "Light Vehicle" and the characters "7:30-8:00" in the cutout image. For example, as shown at (B) in FIG. 16, the image processor 45 puts the characters "Matching" on each of the portions where the specified time-range information and the specified vehicle information are represented. The image processor 45 stores the information of the cutout image after modification into the driving-support-image memory 46, as information of a driving-support image. Note that "modifying to highlight" is not limited to putting the characters "Matching", and may be blinking the characters, enlarging the characters, enclosing the characters with a frame, or the like.

Note that, in the description of the driving-support-image display system according to Embodiment 4, the specified vehicle information is assumed to represent a vehicle type, such as "light vehicle", etc.; however, it is not limited thereto and just has to represent vehicle-related information. For example, the specified vehicle information may be a vehicle height, a vehicle width, a vehicle maximum loading capacity or the like. In such a case, the vehicle information memory 48 stores beforehand information related to the vehicle height, the vehicle width, the vehicle maximum loading capacity or the like.

Further, in the description of the driving-support-image display system according to this embodiment, a case is shown where the characters represented by the specified vehicle information are "Light Vehicle". In contrast, a case is also presumable where specified vehicle information of "Except For Light Vehicle" is represented on a messaging object. In such a case, even if the vehicle type is determined to be "light vehicle" as the result of referring to the vehicle type stored in the vehicle information memory 48 as described in ST511, when there are characters of "Except For" in the character information received from the character recognizer 43, it is allowed that the vehicle-information determination processor 49 determines that the vehicle type of the host vehicle does not match the specified vehicle information, and does not transmit the character information to the image processor 45 to thereby cause the image processor 45 not to execute modification of the cutout image. Meanwhile, in a case where specified vehicle information of "Except For Light Vehicle" is indicated on the messaging object and the vehicle type of the host vehicle is "large-sized vehicle", it is allowed that the vehicle-information determination processor 49 determines that the vehicle type of the host vehicle matches the specified vehicle information, and causes the image processor 45 to execute modification of the cutout image. Accordingly, in the case of determining whether or not the host vehicle matches the specified vehicle information, the vehicle-information determination processor 49 does not determine based solely on matching/non-matching between the characters in the specified vehicle information and the vehicle type stored in the vehicle information memory 48, but comprehensively determines whether or not the characters in the specified vehicle information match the vehicle type, in consideration of presence/absence of the characters such as "Except For" or the like.

Furthermore, the driving-support-image generation device 4 according to this embodiment is configured to include the time determination processor 411 and the vehicle-information determination processor 49; however, it is not limited thereto, and may use only either one of the time determination processor and the vehicle-information determination processor 49. Further, the vehicle information memory 48 and the clock-time counter 410 are not required to be provided as configuration elements of the driving-support-image display system 4. The driving-support-image display system 4 may input the vehicle information and the clock-time information from the outside.

Further, in the description of the driving-support-image display system according to this embodiment, the case is shown where the regulatory sign is captured as the messaging object; however, this is not limitative, and any messaging object is applicable so long as a time-range or vehicle information is represented thereon. For example, with respect also to a parking meter or the like which is placed on a road and is usable in a specified time-range, the driving-support-image display system according to this embodiment can be applied.

The driving-support-image display system according to this embodiment displays the content of the messaging object including the specified time-range information or the specified vehicle information, after modifying it according to the vehicle information or the clock-time information, and thus can provide a driving-support image matched to the situation of the vehicle, so that the passenger can easily recognize whether or not the content represented by the messaging object matches the host vehicle.

Embodiment 5

Figure 19:
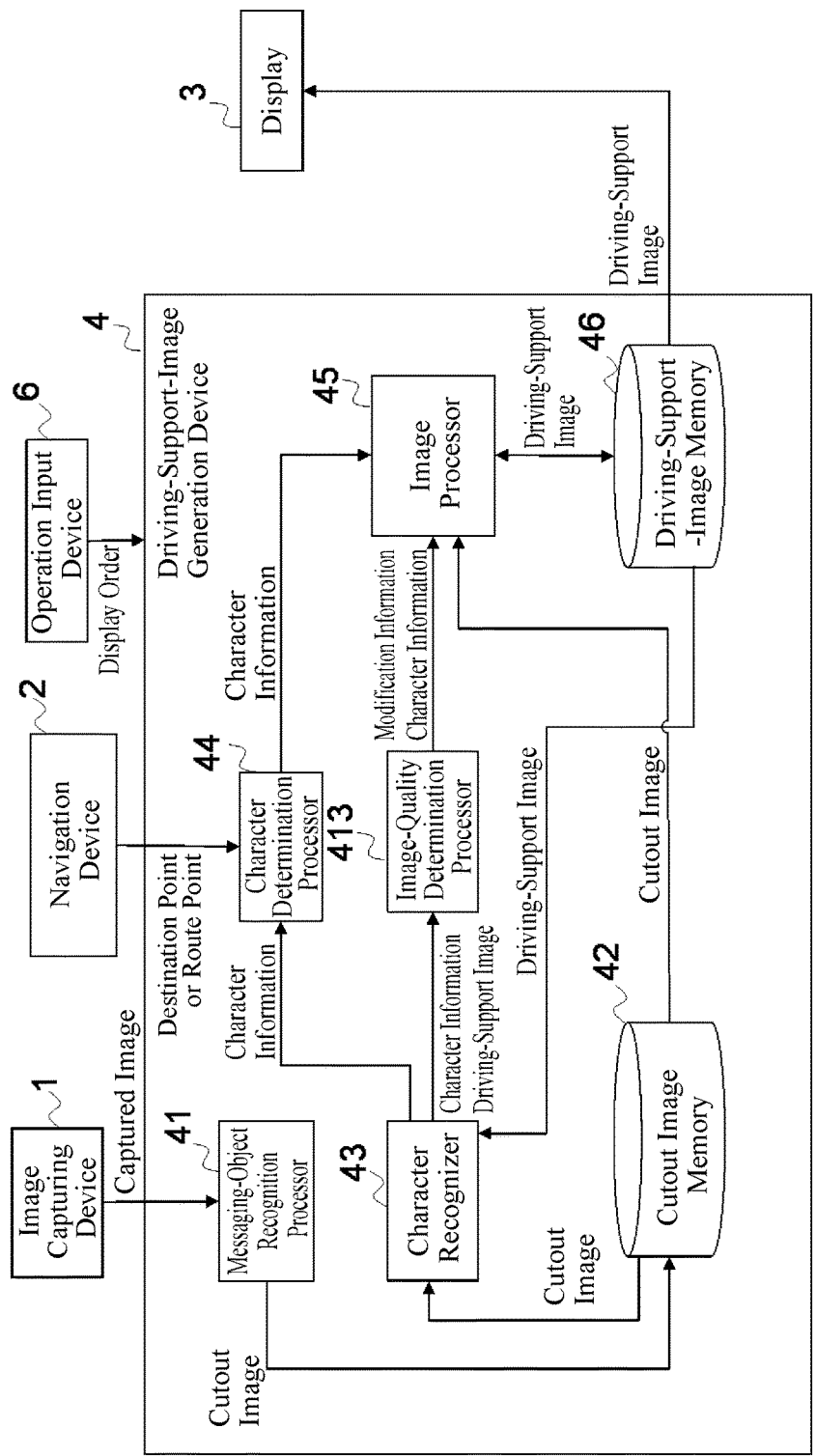
FIG. 19 is a configuration diagram of a driving-support-image display system according to Embodiment 5, which is a diagram in which a configuration of a driving-support-image generation device is shown in detail.
Figure 20:
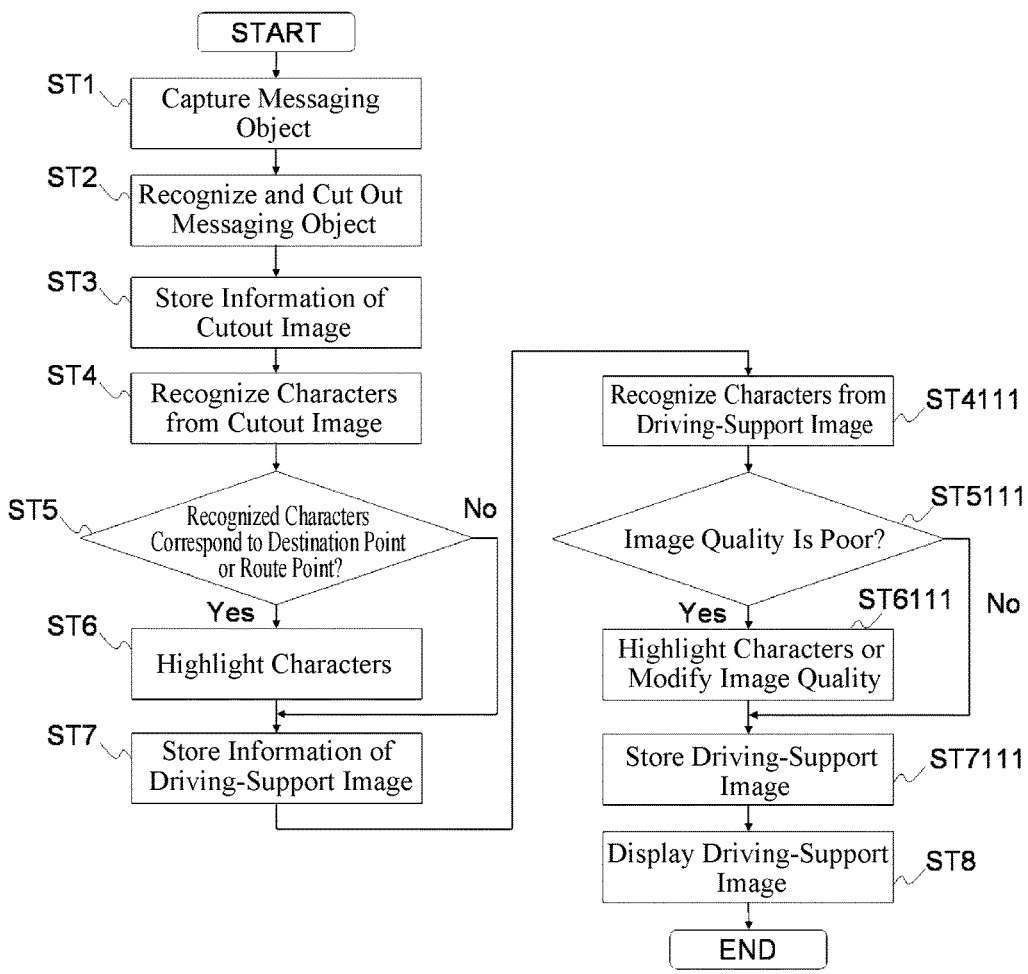
FIG. 20 is an operation flowchart of the driving-support-image display system according to Embodiment 5.
Figure 21:
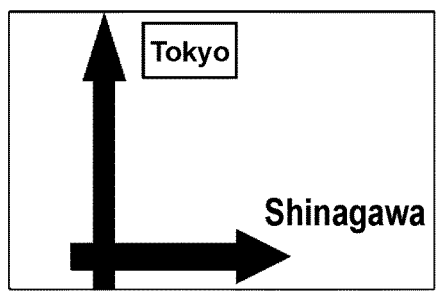
FIG. 21 is a diagram showing driving-support images before and after modification by the driving-support-image display system according to Embodiment 5.
Figure 21:
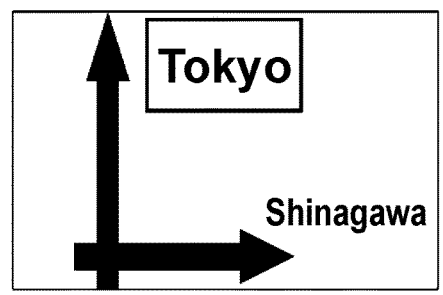

In the following, a driving-support-image display system according to Embodiment 5 will be described using FIG. 19 to FIG. 21. FIG. 19 is a configuration diagram of the driving-support-image display system according to Embodiment 5, which is a diagram in which a configuration of a driving-support-image generation device is shown in detail. FIG. 20 is an operation flowchart of the driving-support-image display system according to Embodiment 5. FIG. 21 is a diagram showing driving-support images before and after modification by the driving-support-image display system according to Embodiment 5. Note that an image-quality determination processor 413 shown in FIG. 19 may be configured by hardware, or may be established by causing a computer to implement a specified program.

The driving-support-image display system according to Embodiment 5 is characterized in that it comprises the image-quality determination processor 413 for determining an image quality of the driving-support image generated based on the driving-support information, and modifies the content of the driving-support image using the image processor 45 according to a determination result of the image-quality determination processor 413.

In the following, the configuration of the driving-support-image display system according to Embodiment 5 will be described using FIG. 19. Note that, with respect to the description of FIG. 19, the same numerals as in FIG. 1, FIG. 2, FIG. 9 and FIG. 17 are given to the parts equivalent to those in the driving-support-image display systems in Embodiment 1 to Embodiment 4, so that their description is omitted here.

The image-quality determination processor 413 determines an image quality of the image stored in the driving-support-image memory 46. Here, the "image quality" means a size of a character included in the messaging object, a contrast, or the like. When the character is in a state difficult to recognize, such as when the character size in the driving-support image is small, when the contrast is low, or the like, the image-quality determination processor 413 determines that the image quality of the driving-support image is poor, and then causes the image processor 45 to execute enlarging the character size, adjusting the contrast, or likewise.

In the image-quality determination processor 413, a threshold value related to the image quality is pre-set, so that the image quality is determined to be poor when the image quality of the driving-support image is equal to or less than the threshold value. For example, in the image-quality determination processor 413, a threshold value of the character size and a threshold value of the contrast are pre-set, so that, when the size of the character in the driving-support image is equal to or less than the threshold value, or the contrast of the driving-support image is equal to or less than the threshold value, the image quality is determined to be poor. Further, in the determination about the contrast, the image-quality determination processor 413 calculates the difference between an average value of brightness in the portion of the character area in the driving-support image and an average value of brightness in other than the character area in the driving-support image, and determines that the image quality is poor when the value of the difference is equal to or less than the threshold value.

In the following, operations of the driving-support-image display system according to Embodiment 5 (processing steps after ST2, by a program according to Embodiment 5) will be described using FIG. 20. Note that, with respect to the description of FIG. 20, the same numerals as in FIG. 4, FIG. 10, FIG. 14 and FIG. 18 are given to the steps equivalent to those in the operations of the driving-support-image display systems in Embodiment 1 to Embodiment 4, so that their description is omitted here. Further, it is assumed that, in ST1 to ST7, the driving-support-image display system captures the messaging object and stores, based on the captured messaging object, its image in which the characters are highlighted, into the driving-support-image memory 46 as the driving-support image. On this occasion, it is assumed that the driving-support image stored in the driving-support-image memory 46 is that shown at (A) in FIG. 21. Further, it is assumed that the characters "Tokyo" represented in FIG. 21 (A) have a size equal to or less than the character-size threshold value pre-set in the image-quality determination processor 413.

In ST4111, the character recognizer 43 reads out the information of the driving-support image (A) from the driving-support image memory 46 and outputs the character information of the characters "Tokyo" having been modified in ST6, to the image-quality determination processor 413. Further, it outputs the read-out information of the driving-support image to the image-quality determination processor 413.

In ST5111, the image-quality determination processor 413 receives the information of the driving-support image and the character information of the characters "Tokyo" from the character recognizer 43. Further, the image-quality determination processor 413 detects the character size from the character information and, when the character size is equal to or less than the threshold value, determines that the image quality is poor. In this example, because the characters "Tokyo" are smaller than the threshold value set in the image-quality determination processor 413, the image-quality determination processor 413 determines that the image quality of the driving-support image is poor. Further, the image-quality determination processor 413 outputs the character information of the characters "Tokyo" to the image processor 45. In addition, the image-quality determination processor 413 outputs modification information to the image processor 45. The modification information is information for the image processor 45 to modify the driving-support image. For example, when the character in the driving-support image is smaller, the image-quality determination processor 413 outputs the modification information indicative that the character is smaller, to the image processor 45. Subsequently, the image processor 45 executes processing in ST6111. Note that when the character size equal to or less than the setup threshold value is not found, the driving-support-image generation device 4 executes ST7111.

In ST6111, the image processor 45 reads out the information of the cutout image from the driving-support-image memory 46, and generates a driving-support image (FIG. 21, (B)) in which the characters "Tokyo" are enlarged, on the basis of the character information of the characters "Tokyo" and the modification information. Note that, in ST5111, it is assumed that the image processor 45 enlarges the characters in the driving-support image; however, it suffices to make the characters easier to see, not limited to by enlarging the characters, but by changing the character color, adjusting the contrast, or likewise.

In ST7111, the image processor 45 stores the thus-generated driving-support image into the driving-support-image memory 46. Furthermore, in ST8, it causes the display 3 to display the driving-support image according to the passenger's operation of the input operation device 6.

Note that in the description of FIG. 19, a case is shown where the image-quality determination processor 413 is added to the configuration in FIG. 2; however, the image-quality determination processor 413 may be added to the configuration in FIG. 9 or FIG. 17. Further, in the description of FIG. 20, the steps from ST4111 to ST7111 are added after ST7 in FIG. 4; however, this is not limitative, and the steps from ST4111 to ST7111 may be added after ST7 in FIG. 10, FIG. 14 or FIG. 18.

As described above, the driving-support-image display system according to Embodiment 5 determines the image quality of the driving-support image and, when determined that the image quality is poor, performs modification to highlight the character in the driving-support image. Thus, even when the image quality of the driving-support image is poor and thus the character is difficult to see, it is possible to provide a driving-support image whose character is easily recognizable by the passenger.

Embodiment 6

Figure 22:
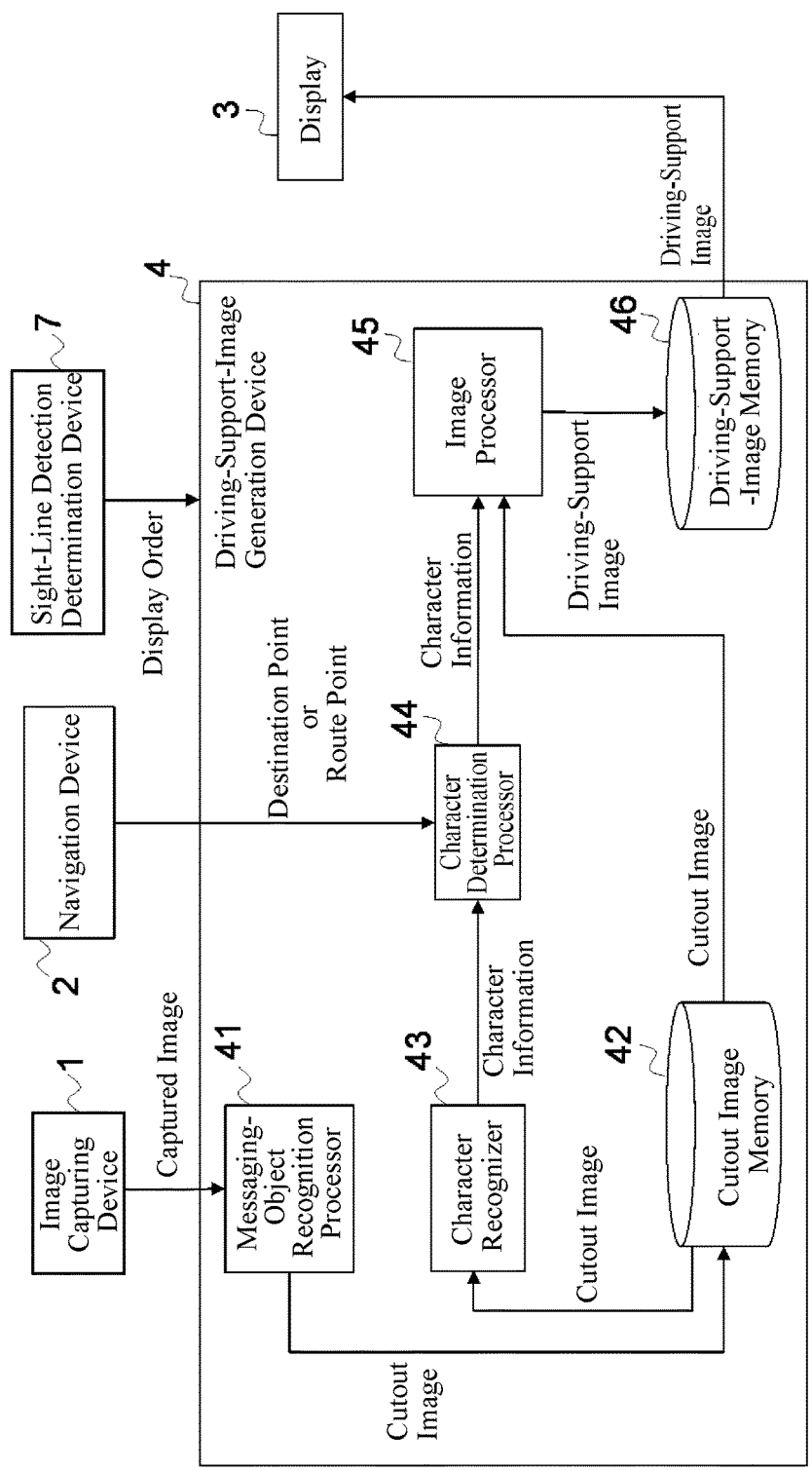
FIG. 22 is a configuration diagram of a driving-support-image display system according to Embodiment 6, which is a diagram in which a configuration of a driving-support-image generation device is shown in detail.

In the following, a driving-support-image display system according to Embodiment 6 will be described using FIG. 22. FIG. 22 is a configuration diagram of the driving-support-image display system according to Embodiment 6, which is a diagram in which a configuration of a driving-support-image generation device is shown in detail. Note that with respect to the description of FIG. 22, the same numerals as in FIG. 1, FIG. 2, FIG. 9, FIG. 17 and FIG. 19 are given to the parts equivalent to those in the driving-support-image display systems in Embodiment 1 to Embodiment 5, so that their description is omitted here.

The driving-support-image display system according to Embodiment 6 is characterized by comprising a sight-line detection determination device 7 that detects the sight line of the passenger to thereby determine whether or not he/she has recognized the messaging object.

A configuration and operations of the driving-support-image display system according to Embodiment 6 will be described using FIG. 22, as follows.

The sight-line detection determination device 7 is placed inside the vehicle and provided with a camera for detecting sight-line information indicative of a direction of the sight line of the passenger. Further, the sight-line detection determination device 7 constantly monitors the sight-line information to thereby determine whether or not the passenger has recognized the messaging object. Note that the sight-line detection determination device 7 is connected by wire or wirelessly to the image capturing device 1, the navigation device 2, the display 3 and the driving-support-image generation device 4, that are shown in FIG. 1, by way of the in-vehicle LAN 5.

The sight-line detection determination device 7 is set with a predetermined time and, when the sight line of the passenger is directed for the predetermined time in a direction in which the messaging object is located, determines that the passenger has recognized the messaging object.

When determined that the passenger has not recognized the messaging object, the sight-line detection determination device 7 outputs a display order to the driving-support-image generation device 4. Upon receiving the display order, the driving-support-image generation device 4 causes the display 3 to display the driving-support image stored in the driving-support-image memory 46.

Note that, the driving-support-image display system according to Embodiment 6 displays the driving-support image stored in the driving-support-image memory 46 when the passenger is determined not to have recognized the messaging object by the sight-line detection determination device 7; however, it is not limited to doing so, and may delete the information of the driving-support image stored in the driving-support-image memory when the passenger is determined to have recognized the messaging object. When it is configured to do so, information of an unwanted driving-support image can be prevented from accumulating in the driving-support-image memory 46, thus making it possible to efficiently utilize its memory capacity.

Further, the driving-support-image display system according to this embodiment may be configured to capture, when the passenger is determined not to have recognized the messaging object, the messaging object using the image capturing device 1 to thereby generate a driving-support image. When thus configured, there is no case where information of the driving-support image is generated when the passenger has recognized the messaging object, so that unwanted processing load can be reduced.

Furthermore, the sight-line detection determination device according to this embodiment is applicable to each of the driving-support-image display systems according to Embodiment 1 to Embodiment 5.

As described above, the driving-support-image display system according to Embodiment 6 is configured to comprise the sight-line detection determination device 7 that detects the sight line of the passenger to thereby determine whether or not the passenger has recognized the messaging object, and to display the messaging object using the display 3 when the passenger is determined to have recognized the messaging object by the sight-line detection determination device 7. Accordingly, the passenger can confirm the driving-support image without operating the operation input device 6, at every time he/she overlooks the messaging object.

Note that, in each of the driving-support-image display systems according to Embodiment 1 to Embodiment 6, it is assumed that the driving-support-image generation device 4 generates the cutout image from the captured image having been captured, and further generates the driving-support image on the basis of the cutout image; however, this is not limitative, and the driving-support image may be generated using a cutout image that had been already and previously captured. For example, at a point where the vehicle passed previously, the driving-support-image generation device 4 had stored into the cutout image memory 42, the information of a cutout image of the captured messaging object in a manner to be associated with the location information of the vehicle. Then, when the vehicle has passed the same point again, the driving-support-image generation device 4 reads out the cutout image specified by the location information of the vehicle from the cutout image memory 42, and modifies its content to thereby generate a driving-support image. When configured to do so, an operation of capturing the messaging object by the image capturing device 1 can be omitted, so that the load of the device can be reduced.

Further, each of the driving-support-image display systems according to Embodiment 1 to Embodiment 6, when going to use at the time of generating a driving-support image, a cutout image that had been previously captured, may receive information of the cutout image captured by another vehicle, in place of reading out the information of the cutout image from the cutout image memory 42 of the host vehicle. For example, when the other vehicle equipped with the support-image display systems according to any one of Embodiment 1 to Embodiment 6 transmits to and stores in an external server the information of the cutout image that had been previously captured and cut out, this makes it possible for the driving-support-image generation device 4 to acquire the information of the cutout image by making access to the server through a roadside device, etc. placed on a road.

Furthermore, in the description of the driving-support-image generation devices 4 according to Embodiment 1 to Embodiment 6, the image processor 45 is assumed to obtain the driving-support image by modifying the cutout image itself having been captured; however, this is not limitative, and it suffices that a content of the captured messaging object is modified and, for example, the driving-support image may be prepared from scratch using CG (Computer Graphics) corresponding to the cutout image. In the case where the driving-support image is to be prepared using CG, the driving-support-image generation device 4 comprises a memory (not shown) that stores beforehand a CG image corresponding to the messaging object, or a part of a CG image partly corresponding to the messaging object, to thereby generate a messaging-object CG image that corresponds to the messaging object captured by the image capturing device 1. In the case where the driving-support image is to be prepared using CG, the messaging-object recognition processor 41 just has to recognize the messaging object from the captured image captured by the image capturing device 1, and is not necessarily required to store said image as a cutout image into the cutout image memory 42.

Further, each of the driving-support-image display systems according to Embodiment 1 to Embodiment 6 may use information of an image that is indicative of the content of a messaging object and is stored beforehand together with map data, instead of generating the driving-support image on the basis of the captured image. In this case, for example, vehicle-travel information may be calculated from a location at which the messaging object is posted and the current location of the vehicle that is the driving-support information. Even if this is the case, when the image stored beforehand is displayed as the driving-support image after the characters therein is modified according to the situation of the vehicle, a similar effect to in Embodiment 1 to Embodiment 6 is achieved.

Note that, when the captured image is used, newest accurate information can be displayed as the driving-support image even if the content of the actual messaging object has been changed or a new messaging object has been posted. For example, with respect to the messaging objects posted on a road or around a road, although a new one will be posted according to new construction of a road, when an image obtained by capturing the thus-posted new messaging object is used, it is possible to obtain a newest driving-support image even if there is no information of an image that is indicative of the content of that messaging object and is stored beforehand together with map data.

Note that each of the driving-support-image generation devices 4 according to Embodiment 1 to Embodiment 6 is assumed to be provided in a vehicle; however, it is not limited to being so provided, and may be provided in a server or the like placed at a specific place outside the vehicle. For example, the display 3 provided in the vehicle may be configured to transmits the driving-support information to the server by wireless communication, and then to receive the driving-support image generated by a driving-support-image generation device 4 provided on the server side. Further, the display 3 may be configured to be connected to a communication means such as a smartphone or the like by wire or wirelessly, to thereby make communication with the server through the smartphone.

Further, the characteristic configurations of the driving-support-image display systems according to Embodiment 1 to Embodiment 6 may be installed in a single common driving-support-image display system.

DESCRIPTION OF REFERENCE NUMERALS AND SIGNS

1: image capturing device, 2: navigation device, 3: display, 4: driving-support-image generation device, 5: in-vehicle LAN, 6: operation input device, 7: sight-line detection determination device, 41: messaging-object recognition processor, 42: cutout image memory, 43: character recognizer, 44: character determination processor, 45: image processor, 46: driving-support-image memory, 47: distance calculator, 48: vehicle information memory, 49: vehicle-information determination processor, 410: clock-time counter, 411: time determination processor.

The invention claimed is:

1. A driving-support-image generation device installed within a host vehicle and operatively connected to a navigation device and a display installed within the host vehicle, the driving-support-image generation device comprising:
a computer processor; and
a memory storing instructions which, when executed by the computer processor, performs a process comprising:
recognizing a character in an image captured by an image capturing device mounted to the host vehicle, the image being indicative of a message content of a messaging object posted on a road or around a road,
determining whether or not the recognized character corresponds to information related to a destination point or a route point of the host vehicle set in the navigation device,
generating a driving-support image in which the recognized character that has been determined to correspond to the information related to the destination point or the route point of the host vehicle is highlighted, and
causing the driving-support image to be displayed on the display.

2. The driving-support-image generation device of claim 1, the process further comprising determining an image quality of the driving-support image prior to highlighting the recognized character, wherein
the recognized character is highlighted in response to a determination that the image quality of the driving-support image is lower than a set threshold value.

3. The driving-support-image display device of claim 1, wherein the driving-support-image display device further comprises a camera of detecting a direction of a sight line of a passenger of the host vehicle,
wherein the process further comprises determining whether the passenger recognizes the messaging object based on the detected direction of the sight line, and
wherein the driving-support image is caused to be displayed on the display when the passenger is determined not to recognize the messaging object.

4. A driving-support-image display system installed within a host vehicle, the driving-support-image generation device, comprising:
an image capturing device mounted to the host vehicle that captures a messaging object posted on a road or around a road;
a driving-support-image generation device operatively connected to a navigation device installed within the host vehicle, the driving-support-image generation device comprising a computer processor and a memory storing instructions which, when executed by the computer processor, performs a process that comprises:
recognizing a character in an image captured by the image capturing device, the image being indicative of a message content of the messaging object captured by the image capturing device,
determining whether or not the recognized character corresponds to information related to a destination point or a route point of the host vehicle set in the navigation device, and
generating a driving-support image in which the recognized character that has been determined to correspond to the information related to the destination point or the route point of host vehicle is highlighted; and
a display that displays the driving-support image.

5. A non-transitory computer readable medium on which is stored a driving-support-image generation program that causes a computer, which is installed within a host vehicle and operatively connected to a navigation device and a display installed within the host vehicle, to perform the following process when executed:
recognizing a character in an image captured by an image capturing device mounted to the host vehicle indicative of a message content of a messaging object posted on a road or around a road;
determining whether or not the recognized character corresponds to information related to a destination point or a route point of the host vehicle set in the navigation device;
generating a driving-support image in which the recognized character that has been determined to correspond to the information related to the destination point or the route point of the host vehicle is highlighted; and
causing the driving-support image to be displayed on the display.

* * * * *